US009164654B2

(12) United States Patent
Goertz et al.

(10) Patent No.: US 9,164,654 B2
(45) Date of Patent: Oct. 20, 2015

(54) USER INTERFACE FOR MOBILE COMPUTER UNIT

(75) Inventors: Magnus Goertz, Stockholm (SE); Joseph Shain, Rehovot, IL (US)

(73) Assignee: Neonode Inc., San Jose, CA (US)

(*) Notice: Subject to any disclaimer, the term of this patent is extended or adjusted under 35 U.S.C. 154(b) by 789 days.

(21) Appl. No.: 12/486,033

(22) Filed: Jun. 17, 2009

(65) Prior Publication Data

US 2010/0017872 A1    Jan. 21, 2010

Related U.S. Application Data

(63) Continuation-in-part of application No. 10/315,250, filed on Dec. 10, 2002, now Pat. No. 8,095,879.

(60) Provisional application No. 61/132,469, filed on Jun. 19, 2008.

(51) Int. Cl.
*G06F 3/033* (2013.01)
*G06F 3/048* (2013.01)
(Continued)

(52) U.S. Cl.
CPC .......... *G06F 3/04817* (2013.01); *G06F 3/0481* (2013.01); *G06F 3/0485* (2013.01); *G06F 3/0488* (2013.01); *G06F 3/04883* (2013.01); *G06F 21/31* (2013.01); *G06F 21/32* (2013.01);
(Continued)

(58) Field of Classification Search
CPC ..................................................... G06F 3/0481
USPC .......................................................... 715/863
See application file for complete search history.

(56) References Cited

U.S. PATENT DOCUMENTS 4,243,879 A    1/1981    Carroll et al.
4,301,447 A    11/1981    Funk et al.
(Continued)

FOREIGN PATENT DOCUMENTS

EP    0513694 A2    11/1992
EP    0330767 A1    10/1993
(Continued)

OTHER PUBLICATIONS

Southern Belle, Nancy Drew—Message in a Haunted Mansion—Walkthrough, Adventure Lantern, available at http://www.adventurelantern.com/walkthroughs/nancydrew3/nancydrew3.htm (posted Oct. 2006).*

(Continued)

*Primary Examiner* — Doon Chow
*Assistant Examiner* — Conrad Pack
(74) *Attorney, Agent, or Firm* — Soquel Group LLC

(57) ABSTRACT

A user interface to access visual gadgets for program applications, wherein the user interface arranges the gadgets in a layout, wherein the layout pans, within a computer touch screen display, to bring a subset of the gadgets into the display and to move another subset of the gadgets out of the display, and in response to an object touching a specific gadget in the display that is not currently activated: activates the specific gadget's program application, replaces the specific gadget within the layout with a GUI window for the specific gadget's program application, wherein the GUI pans, within the window, to bring a portion of the GUI into the window and to move another portion of the GUI out of the window, and moves other gadgets within the layout in order to accommodate space for the window for the specific gadget's program application.

37 Claims, 39 Drawing Sheets

(51) Int. Cl.
*G06F 3/0481* (2013.01)
*G06F 3/0485* (2013.01)
*G06F 3/0488* (2013.01)
*G06F 21/31* (2013.01)
*G06F 21/32* (2013.01)
*H04M 1/725* (2006.01)

(52) U.S. Cl.
CPC ...... *H04M 1/72583* (2013.01); *H04M 2250/22* (2013.01)

(56) References Cited

U.S. PATENT DOCUMENTS

| | | | |
|---|---|---|---|
| 4,518,249 A | 5/1985 | Maruta et al. | |
| 4,550,250 A | 10/1985 | Mueller et al. | |
| 4,703,316 A | 10/1987 | Sherbeck | |
| 4,710,760 A | 12/1987 | Kasday | |
| 4,782,328 A | 11/1988 | Denlinger | |
| 4,790,028 A | 12/1988 | Ramage | |
| 4,847,606 A | 7/1989 | Beiswenger | |
| 4,880,969 A | 11/1989 | Lawrie | |
| 5,036,187 A | 7/1991 | Yoshida et al. | |
| 5,053,758 A | 10/1991 | Cornett et al. | |
| 5,179,369 A | 1/1993 | Person et al. | |
| 5,194,863 A | 3/1993 | Barker et al. | |
| 5,283,558 A | 2/1994 | Chan | |
| 5,414,413 A | 5/1995 | Tamaru et al. | |
| 5,463,725 A | 10/1995 | Henckel et al. | |
| 5,559,727 A | 9/1996 | Deley et al. | |
| 5,577,733 A | 11/1996 | Downing | |
| 5,579,035 A | 11/1996 | Beiswenger | |
| 5,581,681 A | 12/1996 | Tchao et al. | |
| 5,603,053 A | 2/1997 | Gough et al. | |
| 5,612,719 A | 3/1997 | Beernink et al. | |
| 5,618,232 A | 4/1997 | Martin | |
| 5,748,185 A | 5/1998 | Stephan et al. | |
| 5,785,439 A | 7/1998 | Bowen | |
| 5,801,703 A * | 9/1998 | Bowden et al. | 715/841 |
| 5,825,352 A | 10/1998 | Bisset et al. | |
| 5,880,743 A * | 3/1999 | Moran et al. | 345/473 |
| 5,886,697 A * | 3/1999 | Naughton et al. | 345/473 |
| 5,889,236 A | 3/1999 | Gillespie et al. | |
| 5,914,709 A | 6/1999 | Graham et al. | |
| 5,936,615 A | 8/1999 | Waters | |
| 5,943,044 A | 8/1999 | Martinelli et al. | |
| 5,988,645 A | 11/1999 | Downing | |
| 6,010,061 A | 1/2000 | Howell | |
| 6,031,989 A * | 2/2000 | Cordell | 717/109 |
| 6,088,032 A | 7/2000 | Mackinlay | |
| 6,292,179 B1 | 9/2001 | Lee | |
| 6,323,846 B1 | 11/2001 | Westerman et al. | |
| 6,340,979 B1 | 1/2002 | Beaton et al. | |
| 6,359,632 B1 * | 3/2002 | Eastty et al. | 715/716 |
| 6,421,042 B1 | 7/2002 | Omura et al. | |
| 6,429,857 B1 | 8/2002 | Masters et al. | |
| 6,448,985 B1 * | 9/2002 | McNally | 715/784 |
| 6,549,217 B1 | 4/2003 | De Greef et al. | |
| 6,570,557 B1 | 5/2003 | Westerman et al. | |
| 6,664,983 B2 | 12/2003 | Ludoplh | |
| 6,677,932 B1 | 1/2004 | Westerman | |
| 6,690,365 B2 | 2/2004 | Hinckley et al. | |
| 6,690,387 B2 | 2/2004 | Zimmerman et al. | |
| 6,707,449 B2 | 3/2004 | Hinckley et al. | |
| 6,757,002 B1 | 6/2004 | Oross et al. | |
| 6,765,559 B2 | 7/2004 | Hayakawa | |
| 6,788,292 B1 | 9/2004 | Nako et al. | |
| 6,803,906 B1 | 10/2004 | Morrison et al. | |
| 6,857,746 B2 | 2/2005 | Dyner | |
| 6,864,882 B2 | 3/2005 | Newton | |
| 6,888,536 B2 | 5/2005 | Westerman et al. | |
| 6,947,032 B2 | 9/2005 | Morrison et al. | |
| 6,954,197 B2 | 10/2005 | Morrison et al. | |
| 6,972,401 B2 | 12/2005 | Akitt et al. | |
| 7,007,239 B1 | 2/2006 | Hawkins et al. | |
| 7,030,861 B1 | 4/2006 | Westerman et al. | |
| 7,155,683 B1 | 12/2006 | Williams | |
| 7,176,905 B2 | 2/2007 | Baharav et al. | |
| 7,184,030 B2 | 2/2007 | McCharles et al. | |
| 7,232,986 B2 | 6/2007 | Worthington et al. | |
| 7,283,845 B2 | 10/2007 | De Bast | |
| 7,304,638 B2 | 12/2007 | Murphy | |
| RE40,153 E | 3/2008 | Westerman et al. | |
| 7,339,580 B2 | 3/2008 | Westerman et al. | |
| 7,355,594 B2 | 4/2008 | Barkan | |
| 7,372,456 B2 | 5/2008 | McLintock | |
| 7,441,196 B2 | 10/2008 | Gottfurcht et al. | |
| 7,464,110 B2 | 12/2008 | Pyhälammi et al. | |
| 7,479,949 B2 | 1/2009 | Jobs et al. | |
| 8,022,941 B2 | 9/2011 | Smoot | |
| 8,120,625 B2 | 2/2012 | Hinckley | |
| 8,127,141 B2 | 2/2012 | HYpponen | |
| 2001/0002694 A1 | 6/2001 | Nakazawa et al. | |
| 2001/0022579 A1 | 9/2001 | Hirabayashi | |
| 2001/0026268 A1 | 10/2001 | Ito | |
| 2001/0028344 A1 | 10/2001 | Iwamoto et al. | |
| 2001/0055006 A1 | 12/2001 | Sano et al. | |
| 2002/0015064 A1 | 2/2002 | Robotham et al. | |
| 2002/0109843 A1 | 8/2002 | Ehsani et al. | |
| 2002/0173300 A1 | 11/2002 | Shtivelman et al. | |
| 2002/0175900 A1 | 11/2002 | Armstrong | |
| 2003/0002809 A1 | 1/2003 | Jian | |
| 2003/0010043 A1* | 1/2003 | Ferragut, II | 62/126 |
| 2003/0030656 A1* | 2/2003 | Ang et al. | 345/700 |
| 2003/0095102 A1 | 5/2003 | Kraft et al. | |
| 2003/0098803 A1 | 5/2003 | Gourgey et al. | |
| 2003/0234346 A1 | 12/2003 | Kao | |
| 2004/0046960 A1 | 3/2004 | Wagner et al. | |
| 2004/0125143 A1 | 7/2004 | Deaton et al. | |
| 2005/0091612 A1* | 4/2005 | Stabb et al. | 715/816 |
| 2005/0104860 A1 | 5/2005 | McCreary et al. | |
| 2005/0122308 A1 | 6/2005 | Bell et al. | |
| 2005/0165615 A1* | 7/2005 | Minar | 705/1 |
| 2005/0174473 A1 | 8/2005 | Morgan et al. | |
| 2005/0198582 A1* | 9/2005 | Hennum et al. | 715/772 |
| 2005/0253818 A1 | 11/2005 | Nettamo | |
| 2005/0271319 A1 | 12/2005 | Graham | |
| 2006/0001654 A1 | 1/2006 | Smits | |
| 2006/0048073 A1* | 3/2006 | Jarrett et al. | 715/784 |
| 2006/0161870 A1 | 7/2006 | Hotelling et al. | |
| 2006/0161871 A1 | 7/2006 | Hotelling et al. | |
| 2006/0229509 A1 | 10/2006 | Al-Ali et al. | |
| 2007/0024598 A1 | 2/2007 | Miller et al. | |
| 2007/0082707 A1* | 4/2007 | Flynt et al. | 455/564 |
| 2007/0084989 A1 | 4/2007 | Lange et al. | |
| 2007/0146318 A1 | 6/2007 | Juh et al. | |
| 2007/0150842 A1* | 6/2007 | Chaudhri et al. | 715/863 |
| 2007/0152984 A1 | 7/2007 | Ording et al. | |
| 2008/0008472 A1 | 1/2008 | Dress et al. | |
| 2008/0012850 A1 | 1/2008 | Keating, III | |
| 2008/0013913 A1 | 1/2008 | Lieberman et al. | |
| 2008/0055273 A1* | 3/2008 | Forstall | 345/173 |
| 2008/0068353 A1 | 3/2008 | Lieberman et al. | |
| 2008/0086703 A1* | 4/2008 | Flynt et al. | 715/853 |
| 2008/0093542 A1 | 4/2008 | Lieberman et al. | |
| 2008/0100593 A1 | 5/2008 | Skillman et al. | |
| 2008/0111797 A1 | 5/2008 | Lee | |
| 2008/0117176 A1 | 5/2008 | Ko et al. | |
| 2008/0117183 A1 | 5/2008 | Yu et al. | |
| 2008/0121442 A1 | 5/2008 | Boer et al. | |
| 2008/0122792 A1 | 5/2008 | Izadi et al. | |
| 2008/0122796 A1 | 5/2008 | Jobs et al. | |
| 2008/0122803 A1 | 5/2008 | Izadi et al. | |
| 2008/0136790 A1* | 6/2008 | Hio | 345/173 |
| 2008/0158174 A1 | 7/2008 | Land et al. | |
| 2008/0168404 A1* | 7/2008 | Ording | 715/863 |
| 2008/0192025 A1 | 8/2008 | Jaeger et al. | |
| 2008/0211779 A1 | 9/2008 | Pryor | |
| 2008/0259053 A1 | 10/2008 | Newton | |
| 2008/0297409 A1* | 12/2008 | Klassen et al. | 342/357.06 |
| 2008/0297487 A1 | 12/2008 | Hotelling et al. | |
| 2009/0006418 A1 | 1/2009 | O'Malley | |
| 2009/0027357 A1 | 1/2009 | Morrison | |
| 2009/0031208 A1* | 1/2009 | Robinson | 715/227 |
| 2009/0058833 A1 | 3/2009 | Newton | |

(56) References Cited

U.S. PATENT DOCUMENTS

| | | | |
|---|---|---|---|
| 2009/0064055 A1* | 3/2009 | Chaudhri et al. | 715/863 |
| 2009/0066673 A1 | 3/2009 | Molne et al. | |
| 2009/0096994 A1 | 4/2009 | Smits | |
| 2009/0187840 A1* | 7/2009 | Moosavi | 715/767 |
| 2009/0192849 A1* | 7/2009 | Hughes et al. | 705/7 |
| 2009/0285383 A1 | 11/2009 | Tsuei | |
| 2010/0031203 A1 | 2/2010 | Morris et al. | |
| 2011/0239155 A1 | 9/2011 | Christie | |

FOREIGN PATENT DOCUMENTS

| | | | |
|---|---|---|---|
| EP | 0618528 | A1 | 10/1994 |
| EP | 0703525 | A1 | 3/1996 |
| WO | 8600446 | A1 | 1/1986 |
| WO | 8600447 | A1 | 1/1986 |
| WO | 0102949 | A1 | 11/2001 |
| WO | 0295668 | A1 | 11/2002 |
| WO | 03038592 | A1 | 5/2003 |
| WO | 2006020304 | A2 | 2/2006 |
| WO | 2009008786 | A1 | 1/2009 |

OTHER PUBLICATIONS

Wagner, Richard, Professional iPhone and iPod touch Programming: Building Applications for Mobile Safari, Wiley Publishing, pp. ii and 113 (Jan. 2008).*

Adamb et al., Any advice on using DD to drag-pan an overflow:hidden div (a la Google maps) [Online forum thread], Sencha Inc., available at http://www.sencha.com/forum/showthread.php?35505 (first post Mar. 20, 2008).*

Keckeroo et al., Large image—small window [Online forum thread], Sencha Inc., available at http://www.sencha.com/forum/showthread.php?35505 (first post May 14, 2008).*

Hodges, S., Izadi, S., Butler, A., Rrustemi, A., and Buxton, B., ThinSight: Versatile Multi-Touch Sensing for Thin Form-Factor Displays, UIST'07, Oct. 7-10, 2007.

* cited by examiner

Fig. 3

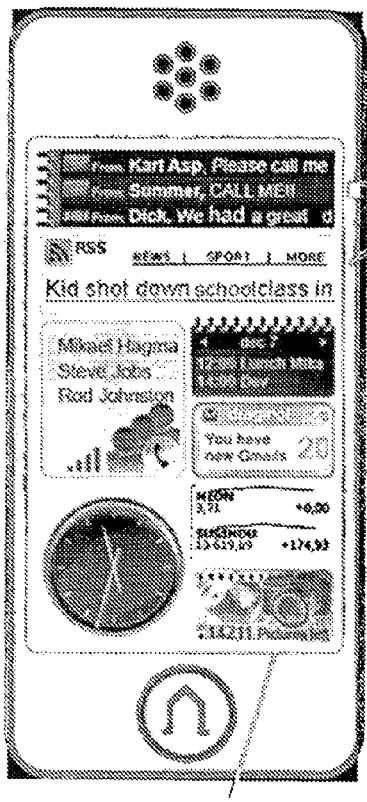

A gadget is an application running on the phone. In their icon like state gadgets are also running showing information like latest incoming message, current song played, currency, weather etc. A gadget can be any type of application:

-Streaming Radio
-Note book
-Web mail
-Phone application
-Clock
etc.

A gadget can be updated with information both from the phone (new SMS) or from a third party over the Internet (RSS feed).

A gadget in an icon state on the home screen can only occupy a defined space.

In most cases a gadget can be expanded and either displayed as an overlay directly on the home screen like the volume control or displayed as a full screen application like the camera.

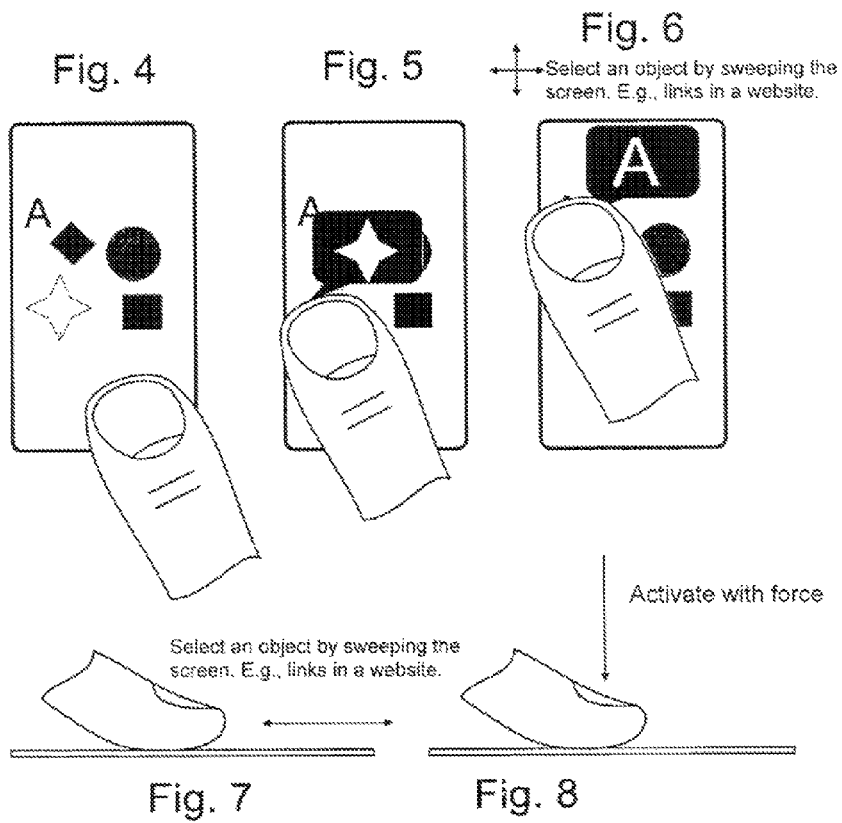

Power ON

Press Home key

Power OFF

Press off Gadget or
hold Home key for 5 seconds

Key lock

Tap key lock to lock

Tap home button to start

Key lock high security

Tap home button to start. Tap code one, two, three or four digits.

Home/ return from application

Tap home

Scroll Alternatives

Alternative 4
Scroll directly on the screen.
Then we miss the possibility to touch and drag on other gadgets.

Fig. 19   Fig. 20   Fig. 21
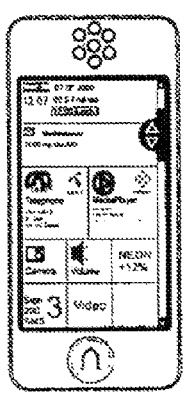
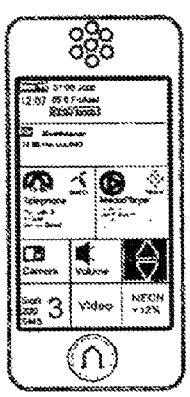
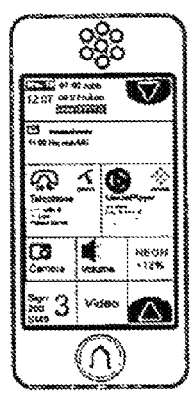
Alt 1
Scrollbar put finger
on the side and scroll
down to get lower down
on the page
Alt 2
Drag button
Put finger on button and
drag screen up and down
Alt 3
Two drag buttons. Same
function as Alt 2.
Put finger on the lower scroll
button and drag screen up
or on the upper icon and
drag down.
Sign
200
SMS Fav 5

Tap fav 5

Tap Call to make a call
Tap SMS to SMS that person
More for rearranging/edit...

History

Tap history

Tap to call or SMS
Optional included SMS history

Telephone

Tap telephone

Active call

Volume

Press volume button

At this point you can select to change another sound source. Control disappears after 4 seconds.

Media Player

Tap player

Media Player

Control disappears after 4 seconds.

Alternative 2: Fixed position.
Reduce monthly fee.

Video

Tap video

Video

Tap the screen and use controls.
Controls disappear after 4 seconds.

Camera

Tap Camera

Camera

Use controls

Camera

Send picture to

Messaging SMS

Tap message gadget.

Select message.

Could also be same structure as call history. See previous description.

Home screen

Open gadget / browser

Push / tap and release a gadget to open / activate

FIG. 49

Open gadget / browser

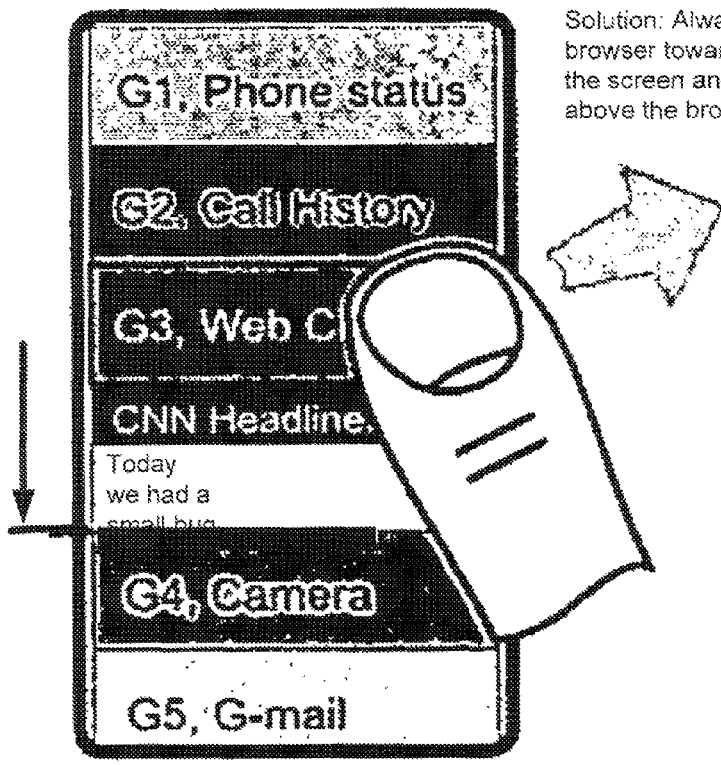

Problem: Only one browser session can be opened at a time. How can we tell the user that in an intuitive way and still stay in the same screen and keep important information at the top?

Solution: Always open the browser towards the bottom of the screen and keep content above the browser gadget.

When a web gadget is activated all gadgets beneath the web gadget slide down and disappear. Instead, the browser takes this space.

Open gadget / browser

Panning gadget

Panning web

Panning web

USER INTERFACE FOR MOBILE COMPUTER UNIT

CROSS REFERENCES TO RELATED APPLICATIONS

This application is a continuation-in-part of pending application U.S. Ser. No. 10/315,250, filed on Dec. 10, 2002, entitled USER INTERFACE FOR MOBILE HANDHELD COMPUTER UNIT. This application claims priority from provisional application No. 61/132,469, filed on Jun. 19, 2008, entitled IMPROVED KEYPAD FOR CHINESE CHARACTERS.

FIELD OF THE INVENTION

The field of the present invention is user interfaces for electronic devices and, more particularly, to touch screen user interfaces.

BACKGROUND OF THE INVENTION

Touch screens provide user interfaces through which a user enters input to a computing device by touching a screen at a selected location, with a stylus or with his finger.

Conventional touch screens are limited as to the types of user inputs that they can recognize. For example, conventional touch screens are unable to distinguish between a soft tap and a hard press. In some prior art embodiments users initially select an item on the screen, and then subsequently activate the selected item. However, because prior art touch screens do not distinguish between degrees of pressure, the user is required to remove his finger or stylus from the screen and activate his selection with a second tap. It would be advantageous to produce touch screens that distinguish between varying amounts of pressure applied to the screen so that a user can select an item by touching its location on the screen, and then activate the item by applying additional pressure to the touch location without having to first remove his finger or stylus from the screen.

In conventional touch screens the keys are often small relative to the touch area, especially in handheld devices. The keys are also often situated close together. This can make it difficult to determine which key is being pressed by the user. It would be advantageous to clearly indicate to the user which key the user has selected, and furthermore, to allow the user to accept or reject the selected key without first removing his finger or stylus from the screen in order to perform a second tap.

Current user interfaces are basic and often require navigation through a series of menus in order to perform a desired operation. The present invention presents a user interface that is versatile in providing the user with many options, while requiring only few selections to activate a desired function. To further enhance user experience, certain functions are performed automatically without requiring the user to enter a selection.

SUMMARY OF THE DESCRIPTION

Aspects of the present invention relate to user interfaces designed for use with a touch screen. The present invention relates to computer readable media storing computer programs with computer program code, which, when read by a computer unit, allows the computer to present a user interface for the computer unit.

In accordance with embodiments of the present invention, the computer unit features a touch sensitive display area. According to preferred embodiments an initial display configuration presents a plurality of gadgets on the display. These gadgets are small areas of the screen that indicate which functions each gadget will perform when activated by the user. When a gadget is activated, typically by the user touching the area of the display on which the gadget is displayed, the gadget increases in size and provides the user with icons and information about the gadget's functions. Significantly, the gadget does not cover the entire display area. Thus, when a gadget, or even a plurality of gadgets, is active, the primary display of all available gadgets is still accessible. This primary display can be compared to a desktop in computer operating system user interfaces. However, this primary display in the user interface of the present invention is not the same as a desktop where active windows can cover icons on the desktop. In the present invention, gadgets are arranged in a manner that open gadgets do not cover other gadgets. Rather, when an open gadget expands in size, other gadgets are shifted to make room for the expanded gadget. This allows the user to scroll the primary display or desktop to view any gadget. In the context of the present invention, this primary display area that includes both open and closed gadgets is called the home window. The user scrolls the home window to view gadgets that are shifted beyond the viewable area of the display. An expanded, or activated, gadget has an expanded window, but often it is not large enough to display everything contained in that gadget window. To view contents of the gadget not displayed in the visible portion of the gadget window, the user scrolls the gadget window. Thus, two different scroll operations are provided: scrolling the home window and scrolling a gadget window. According to one embodiment, scrolling is executed by gliding a finger or stylus along the touch screen to shift the active display area of the home window or of the gadget. The scrolling affects the home window if the finger glide began in an area of the screen that does not belong to an active gadget; the scroll affects an active gadget window if the finger glide began inside that active gadget window.

Various embodiments of the invention support several methods of scrolling a window. According to one embodiment, scrolling is done when the user touches the display inside the window area, for example at an edge of the window, or on an icon, such as an arrow or scrollbar, indicating a scroll operation. According to another embodiment, scrolling is done by the user touching the window with a finger or stylus and then gliding the finger or stylus along the touch sensitive screen in a direction indicating the desired direction of the scroll. When the content of the home display is larger in two dimensions than the actual display screen, this operation is like panning an image or map. When it is larger along only one axis (e.g., only vertically), the scrolling only scrolls in the one axis even when the glide is not orthogonal along the one axis.

Another aspect of the present invention relates to computer readable media storing a computer program with computer program code, which, when read by a mobile handheld computer unit, allows the computer to present a user interface for the mobile handheld computer unit. The user interface features a touch sensitive area in which representations of a plurality of keys are displayed, and each key is mapped to a corresponding location in the touch sensitive area at which the representation of the key is displayed. A key in this context includes, inter alia, alphabetic keys such as in a QWERTY keypad, numeric keys and also icons representing programs or functions. A key is selected, but not activated, when an object touches the corresponding location. This intermediate status of being selected but not activated facilitates the user to subsequently activate a desired key and avoid activating a neighboring key that the user selected but does not wish to activate. A selected key is activated when the object touching it applies additional pressure to the key location.

According to preferred embodiments of the invention, when a key is selected, the user interface generates a secondary representation of the key, such as a callout balloon containing the key representation. The callout balloon is placed away from the key location (being touched) so that the user can easily view which key is selected without lifting his finger. According to another embodiment, an audio representation of the selected key is generated so the user hears which key was selected.

According to still further features in preferred embodiments of the invention, the user touches the screen (with a finger or stylus) at a first location, for example selecting a first key. The user then glides his finger or stylus over the screen to additional locations. At each additional location a new key is selected and the previously selected key is deselected. The user can activate any selected key by applying additional pressure to the screen. The user does not have to remove the object from the screen to glide and select additional keys even after activating a first key.

Additional touch pressure is detected in various ways according to several embodiments. According to one embodiment, the touch sensitive area is a light-based touch screen operable to detect different levels of touch pressure. For example, light-based touch screens typically include a calculating unit operable to identify the size, shape and contours of an area being touched based on a pattern of obstructed light. See applicant's co-pending U.S. patent application Ser. No. 10/494,055, titled ON A SUBSTRATE FORMED OR RESTING DISPLAY ARRANGEMENT, the contents of which are incorporated herein by reference. When a finger or flexible object is used as a touch object, as additional pressure is applied to the touch surface, the contact area of the finger or object touching the screen increases. Thus, additional pressure is detected when an increase in the contours of the covered touch area is detected.

Alternatively, or in combination with the above, the touch sensitive area features both a touch screen operable to identify a touch location on the screen and a pressure sensor operable to detect pressure applied to the screen but not sensitive to the location of the object applying the pressure.

Other aspects of the present invention relate to convenient arrangement and function of icons to perform popular functions within a user interface. Thus, a camera gadget features a multimedia messaging service (MMS) button facilitating sending an active photo in an MMS message; a keylock gadget locks the computer and displays an instrumental keypad for entering a musical code to unlock the computer; a reporting gadget displays information for a first period of time and is then automatically deactivated. Several reporting gadgets are provided, including a gadget that displays the time of day; a gadget displays a weather forecast; a gadget that displays stock market information.

According to still further features in preferred embodiments the reporting gadget continues to display its information for a second period of time if the gadget is touched during the first period of time. I.e., automatic deactivation after the first period of time is canceled.

BRIEF DESCRIPTION OF THE DRAWINGS

The present invention will be more fully understood and appreciated from the following detailed description, taken in conjunction with the drawings in which:

FIG. 3 is a screen of a handheld terminal displaying a plurality of gadgets, in accordance with an embodiment of the present invention;

FIGS. 4-6 are diagrams illustrating selection of elements displayed on a touch screen. A selected element is displayed in a callout as shown in FIGS. 5-6. The user does not lift his finger off the screen between selection of different elements, as in FIGS. 5 and 6. The use simply glides his finger along the screen. This is shown in FIG. 7. To activate a selected element the user presses on the screen without first lifting his finger off the screen as shown in FIG. 8 and in the series of FIGS. 7-8, all in accordance with an embodiment of the present invention;

FIGS. 7-8 illustrate a side view of a user selecting and activating an on-screen element, in accordance with an embodiment of the present invention;

FIG. 9 illustrates pressing the home key on a turned-off phone. FIG. 10 illustrates the phone when it is turned on. FIG. 11 illustrates pressing the home key to turn a phone off.

FIG. 12 illustrates activating a lock gadget onscreen to lock the phone. FIG. 13 illustrates pressing the home button on a locked phone to unlock the phone. FIG. 14 illustrates the unlocked phone. FIG. 15 shows pressing the home key on a locked phone to display a keypad for entering a security code to unlock the phone.

FIG. 16 shows an open active calling gadget. Pressing the home button presents the home screen shown in FIG. 17.

FIGS. 18-21 illustrate scrolling options. In the phone shown in FIG. 18 scrolling is done by gliding a finger or stylus along the touch sensitive screen. FIG. 19 illustrates a scrollbar along one edge of the screen for scrolling up and down. FIGS. 20-21 illustrate arrow buttons for scrolling up and down.

FIG. 30 illustrates the shortcut buttons presented when an incoming call is received (i.e., when the phone is ringing).

FIG. 45 illustrates how related SMS messages are displayed as a conversation in an active SMS gadget; and FIGS. 46-54 illustrate scrolling the home display screen and gadget windows, in accordance with an embodiment of the present invention.

DETAILED DESCRIPTION

Touch screen keypads offer great flexibility in keypad interface design—flexibility that cannot be achieved with electromechanical keypads. Custom design keypads can be generated on a touch screen, where the markings on each key and the functions that each key provides are optimized for a designated application. Moreover, touch screen keypads can change modes, from one pad of keys and associated functions to a different pad of keys and associated functions. Custom keypads are of particular advantage for multi-lingual applications.

A general description of touch screen keypad interfaces, in accordance with embodiments of the present invention, and several examples thereof, are described in detail hereinbelow.

Embodiments of the present invention relate to improved keypads for inputting Chinese characters using XT9 stroke input, and using Chinese Pinyin. XT9 stroke input builds Chinese characters using six basic strokes, and offers selection of possible characters and phrases based on a set of strokes that have been input. Chinese Pinyin uses Latin characters that transliterate a sound or a syllable, in combination with a digit that represents an intonation or inflection. E.g., Ma in a rising tone is m-a-1, and Ma in a descending tone is m-a-2.

Figure 1:
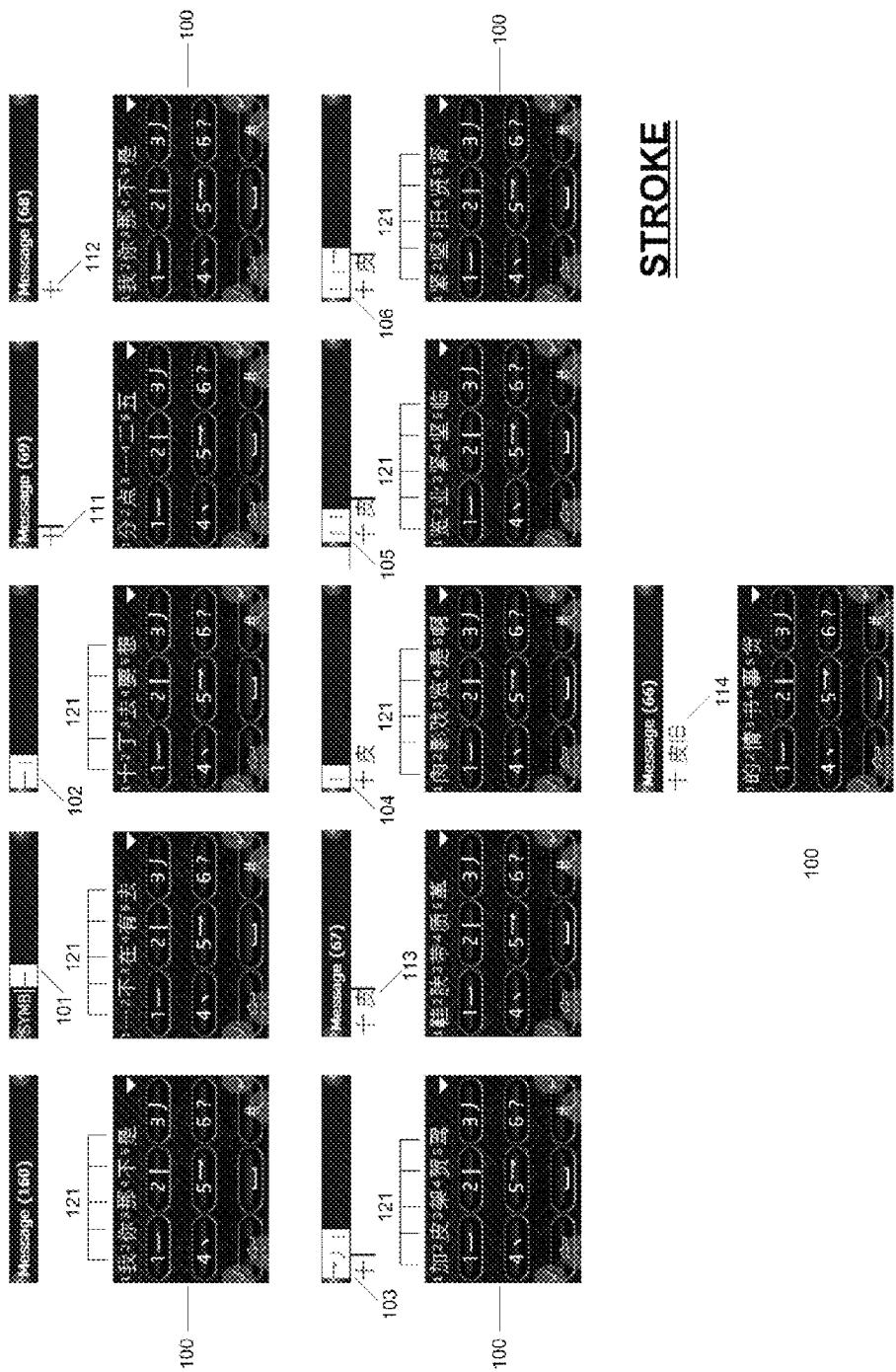
FIG. 1 is a series of screens illustrating Chinese stroke input, in accordance with an embodiment of the present invention.

Reference is now made to FIG. 1, which is an illustration of an improved stroke-based keypad for entering Chinese characters by inputting strokes, in accordance with an embodiment of the present invention. Shown in FIG. 1 is a keypad 100, used for inputting basic strokes. Also shown in FIG. 1 is a sequence of strokes 101-106 that are successively input by a user, and a corresponding sequence of Chinese characters 111-114 that are entered in a message being composed.

In accordance with an embodiment of the present invention, keypad 100 is generated and displayed on a touch screen. Keypad 100 has fewer than the standard 12 keys in a touch pad, allowing more room on screen for displaying characters.

Further in accordance with an embodiment of the present invention, the keys of keypad 100 are customized so that they contain only relevant information. For example, a prior art keypad displays a digit, 3-4 characters, and a basic Chinese stroke, all inside one key, even though in XT9 stroke mode the basic Chinese stroke is the only useful one. The custom keys of the present invention display only the basic Chinese strokes, or the strokes and numbers, but no characters.

There are two types of key presses supported by keypad 100—regular and long. A regular key press adds the stroke shown on the key to the series of strokes 101-106 already pressed. As strokes are successively entered, a numbered array 121 of Chinese characters or phrases is dynamically displayed along the top of the keypad. These characters or phrases are predicted based on the key presses already entered. In order to select one of the numbered elements of array 121, the user performs a long key press on that number. Alternatively, the user may keep entering strokes until only one option remains.

Often, however, more predicted characters or phrases exist than can be displayed along the top of the keypad. The N2 phone, manufactured by Neonode of Stockholm, Sweden, has a joystick button at the bottom of the phone. Twitching the joystick up/down displays different sets of predicted characters or phrases. When the intended character or phrase is displayed and associated with a given digit, a long press on that digit serves to select the intended character or phrase.

Figure 2:
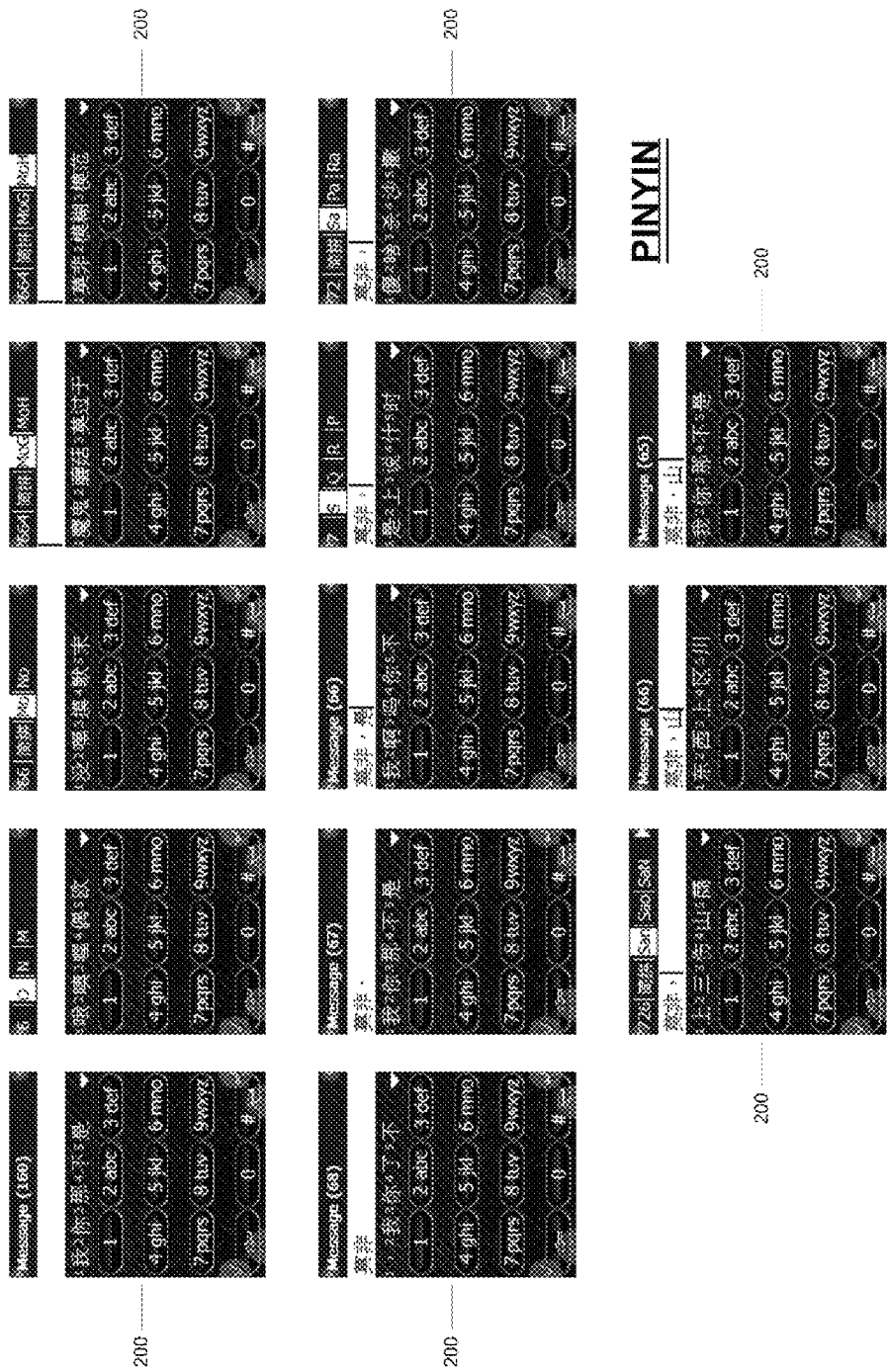
FIG. 2 is a series of screens illustrating Chinese Pinyin input, in accordance with an embodiment of the present invention.

Reference is now made to FIG. 2, which is an illustration of an improved keypad for inputting Chinese characters using Pinyin, in accordance with an embodiment of the present invention. Shown in FIG. 2 is a keypad 200, used for inputting Latin characters. Also shown in FIG. 2 is a sequence of Latin characters M-o-H-S-a-n that are successively input by a user, and a corresponding sequence of Chinese characters that are entered in a message being composed.

In accordance with an embodiment of the present invention, keypad 200 uses accent characters, rather than digits, to convey an intended intonation or inflection. Further in accordance with an embodiment of the present invention, keypad 200 displays only information relevant for Pinyin input on each key; no Chinese basic strokes are shown.

There are two types of Pinyin input. A user enters a Latin transliteration of an intended word using the Latin keypad input (12 keys). For each key, several letters are possible. The list of predicted Latin syllables based on the current sequence of keypad presses is displayed. Twitching the joystick right or left selects the desired combination. Also, a series of predicted Chinese characters or phrases is displayed and selected by a long press on a respective digit. Twitching the joystick up/down displays other predicted Chinese characters or phrases. Entering a space after a series of letters indicates the end of a previous character or phrase.

In accordance with an embodiment of the present invention, the user is able to combine stroke and Pinyin input, and compose a sequence of at least two Chinese characters using XT9 stroke input for at least one character and Pinyin input for at least one other character. The user switches between XT9 stroke input mode and Pinyin input mode by performing a sweeping motion in relation to the touch screen, such as, inter alia, sweeping a finger across the top of the touch screen. The series of at least two Chinese characters may be a text message, a name, a data entry, or any other such input.

Further in accordance with an embodiment of the present invention, the user is able to compose a series of at least one Chinese character and at least one non-Chinese term, wherein the non-Chinese term includes at least one Latin character, digit, emoticon, punctuation mark, another non-Chinese symbol, or any combination thereof. The series is composed by switching input modes for each alphabet or Chinese input or digit input by sweeping across the top of the touch screen. For example, the user may input at least one Chinese character using either Pinyin or stroke input, or a combination thereof. The user may then perform a sweeping motion in relation to the touch screen to change the input mode to English. For example, the user may sweep a finger across the top of the touch screen to change the input mode to English. In this mode, the keypad presents Latin characters. The user then proceeds to input Latin characters using the Latin keypad displayed on the touch screen. Alternatively, the user may repeat a series of sweeping motions; e.g., the user sweeps a finger across the top of the touch screen, repeatedly, changing the input mode with each sweeping motion, until a digit keypad is displayed and digit input mode is active. The user may then proceed to enter at least one digit, adding the at least one digit to the series of Chinese characters already contained in the message. It will thus be appreciated that the user may switch between different input modes while composing a single message, a command, a name, a data entry or another such input, including at least two different types of characters, in an easy and simple and convenient manner.

Further in accordance with an embodiment of the present invention, a keypad displaying emoticons is displayed. In this mode, the user may select an emoticon to be entered into the text of a message, or such other input.

Yet further in accordance with an embodiment of the present invention, drawings, including inter alia, emoticons, are constructed in a similar manner to XT9 stroke input. In this mode, the user interface displays the basic building blocks for the drawing, such as a curve, a semicolon, a circle, and other symbols. As the user taps multiple symbols, possible drawings or emoticons that can be formed using the selected elements are displayed, and the user may either select the desired complete drawing or emoticon from the displayed list, or may continue entering additional building blocks until only one option remains. This mode of input is convenient as the number and size of the keys presented is optimized for the number of available building blocks, and each key only displays information relevant for the active input mode.

Embodiments of the present invention provide methods and systems for enabling multiple input modes, whereby the screen display in each input mode is optimized for that mode. Optimizations include (i) configuring the number of keys displayed, (ii) configuring the size, position and shape of the keys in relation to the screen, (iii) configuring the size, position and shape of the area of the display showing text already entered, (iv) configuring the size, position and shape of the area of the display showing possible completions for the current character, phrase or symbol, and (v) displaying only at least one character, symbol, digit or other figure that is relevant to the active input mode on each key.

Embodiments of the present invention also provide methods and systems for enabling multiple input modes and switching between the input modes by performing a sweeping motion in relation to the screen. These methods and systems are easier and more convenient than using a menu interface to switch input modes. Additionally, these methods do not use up screen space to provide a switching key, to switch between input modes, and, as such, screen space may be used for information related to the current input mode and the current text. These methods and systems also enable switching between many input modes, by repeating the sweeping motions to advance through the input modes. In the N2 phone manufactured by Neonode AB, this mode of switching active keypads is used with standard 12-key keypads, for example, inter alia, switching between numeric, Swedish and English keypads. However, switching the layout of the keys is not used in the Neonode N2 phone. Moreover, other, prior art methods of switching between input modes require more than one action to advance through a list of input modes.

Reference is now made to FIGS. 3 and 9-45, which include several exemplary touch screen interfaces. Shown in FIG. 3 is a touch screen interface, displaying a clock dial in the lower left corner of the screen. Several gadgets are displayed in the touch screen, each gadget representing an application that runs on the phone.

According to embodiments of the present invention, selection and subsequent activation of an on-screen element, such as, inter alia, a gadget, a letter, a key, a button or an icon, is implemented by two primary features. The first feature, referred to as pressure sensing, provides the touch screen with one or more pressure sensors operative to determine contact with the screen by an external object such as a finger. In one embodiment, the user places a finger or a stylus over the desired on-screen element to select it, as illustrated in FIGS. 4-7, and then applies pressure to the screen to activate the on-screen element, as illustrated in FIG. 8. In another embodiment, the user selects the on-screen element by placing a finger or stylus over the position of the on-screen element but not in contact with the screen. Several touch screen devices, such as certain light-based touch screens and certain tablet personal computers, enable detection of a finger or other pointing device over a position on the screen without making actual contact. Applicant's co-pending U.S. patent application Ser. No. 12/371,609, now U.S. Pat. No. 8,339,379, for LIGHT BASED TOUCHSCREEN, filed on 15 Feb. 2009, is incorporated herein in its entirety by reference. In another embodiment, the user selects the on-screen element with a finger or other pointing device in contact with the screen and activates the on-screen element by removing his finger or pointing device from contact with the screen. In another embodiment, the user selects the on-screen element with a finger or other pointing device in contact with the screen and activates the on-screen element by increasing the pressure of contact with the screen. In this case the pressure sensor distinguishes between the initial contact and the subsequent high pressure contact. This is illustrated in FIGS. 7 and 8 showing a profile of a finger in contact with a display, where only the thickness of the display is shown. In FIG. 7 the finger moves across the screen to select at least one element. Movement across the screen is indicated by a double-tipped arrow parallel to the screen surface. Once an element is selected by positioning the finger over a desired element, the element is activated by applying pressure to the screen as indicated by the down-pointing arrow in FIG. 8.

The second feature, referred to as callout balloons, indicates a selected on-screen element to the user by displaying a graphic, such as by (i) enlarging the on-screen element, (ii) displaying a callout balloon with a copy of the on-screen element inside, or (iii) a combination thereof. The callout balloon is illustrated in FIGS. 5 and 6. FIG. 5 shows a star inside a callout balloon, and FIG. 6 shows the letter 'A' inside a callout balloon. As the user moves his finger over the screen, different callout balloons appear. Callout balloons are generated in such a manner that the user's finger and hand do not obstruct the user from viewing the callout balloon. Thus, for example, the callout balloon appears above the finger as shown in the figures. When the finger is at the top of the screen the callout balloon is displayed off to a side of the screen that is visible to the user. The user may configure the interface to display callouts to the left or right of his finger. For example, a user who operates the phone with his left hand may prefer to display callout balloons off to one side of his finger, and a user who operates the phone with his right hand may prefer that callout balloons display to the other side of his finger. These two features of pressure sensing and callout balloons can be applied separately or in combination.

Figure 9:
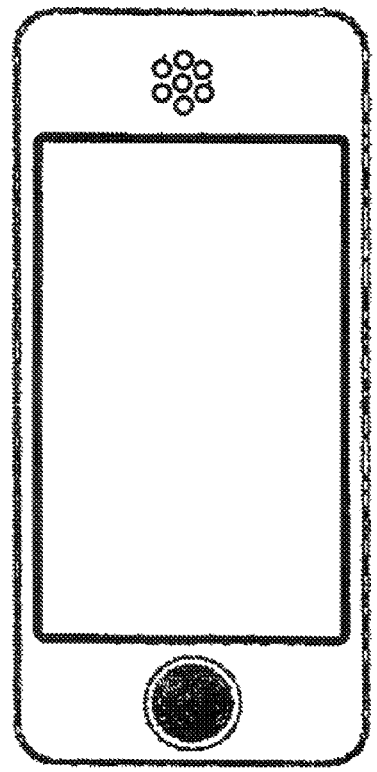
FIGS. 9-11 illustrate turning a phone on and off.
Figure 10:
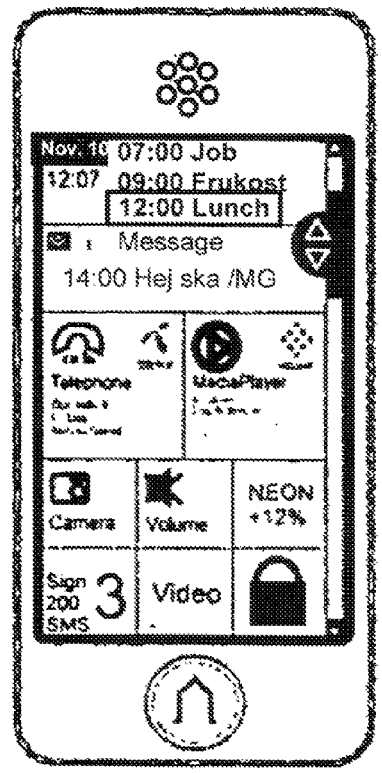
Figure 11:
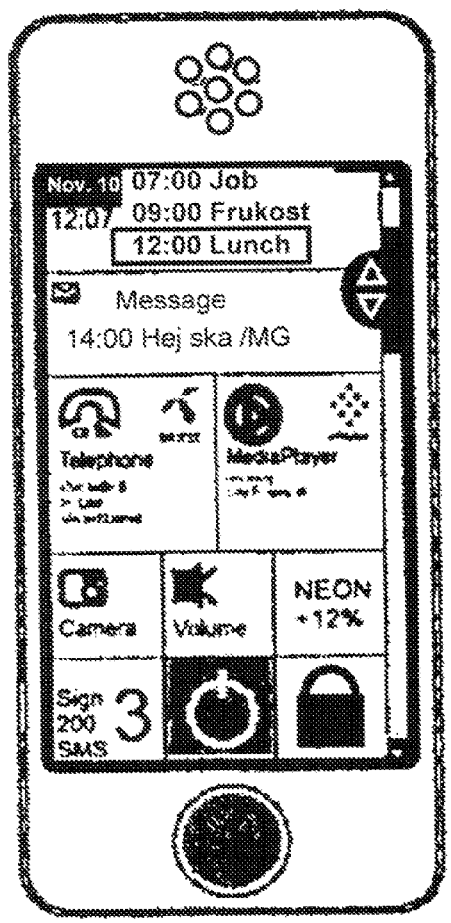

In accordance with an embodiment of the present invention, touch screens for phones captioned "Power ON/Power OFF" are shown in FIGS. 9-11. Two phones are displayed under the "Power ON" caption; namely, a first phone (FIG. 9) with a blank screen, indicating that power is off, and a second phone (FIG. 10) with gadgets displayed thereon, indicating that power is on. A "home key" is displayed at the bottom of the phones. Activating the home key, such as by touching the key, causes the power to be turned on. A single phone is displayed in FIG. 11 under the "Power OFF" caption. Touching the home key for an extended period of time, such as for 5 seconds, causes the phone to power off. An "off" gadget is shown at the bottom center of the display screen. Activating the "off" gadget also causes the phone to power off.

Figure 12:
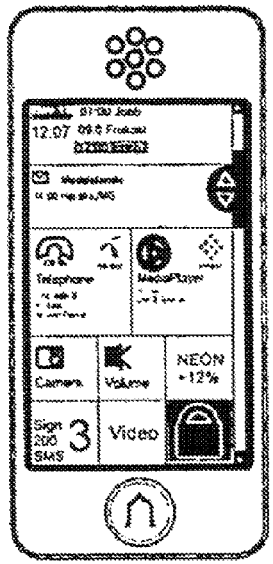
FIGS. 12-15 illustrate locking and unlocking a phone.
Figure 13:
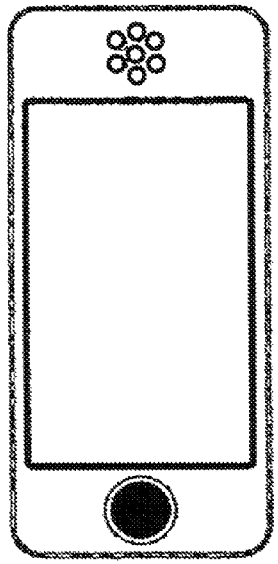
Figure 14:
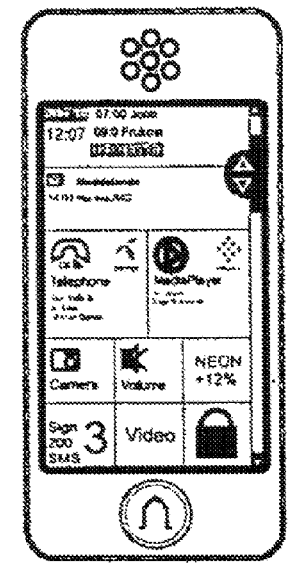

Additionally in accordance with an embodiment of the present invention, touch screens for phones captioned "Key lock" are shown in FIGS. 12-15. In FIG. 12 a lock gadget is displayed in the lower right corner of the screen. Activating the lock gadget, such as by pressing on it, causes the phone to lock. When the phone is locked activation of the phone is restricted is some manner. E.g., when the phone is locked, touching the screen in a way that would activate a gadget when the phone is unlocked, does not activate the gadget when the phone is locked. In order to unlock the phone, the user activates the home key, located at the bottom center of the device, as shown in FIG. 13. FIG. 14 shows the phone after it has been unlocked: gadgets are now displayed on screen and are activated in response to user input.

Figure 15:
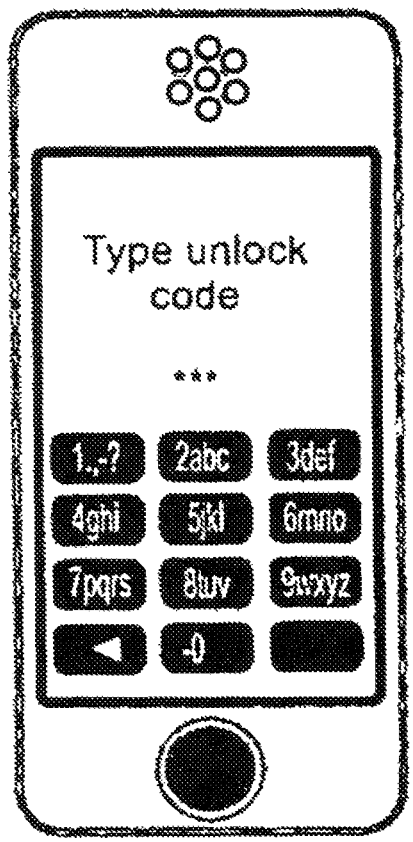

Further in accordance with an embodiment of the present invention, a touch screen for a phone captioned "Key lock high security" is shown in FIG. 15. When the home key is activated, such as by touching the home key, a keypad is displayed and a user is prompted to enter a security code. Subsequently, the phone cannot be unlocked unless the security code is entered. Optionally, additional security is implemented by use of fingerprint identification, wherein the phone cannot be unlocked unless a fingerprint is authenticated. Optionally, additional security is implemented by requiring the user to glide a finger over the screen in a designated gesture, in order to unlock the phone. The phone cannot be unlocked unless the touch screen detects the designated gesture. Examples of designated gestures include inter alia, an "S" shaped gesture, or a gesture wherein multiple corners of the screen are touched concurrently or in sequence. Optionally, additional security is implemented by displaying a musical keypad or keyboard and the user must play a particular tune of at least one note on the keypad or keyboard in order to unlock the phone.

Figure 16:
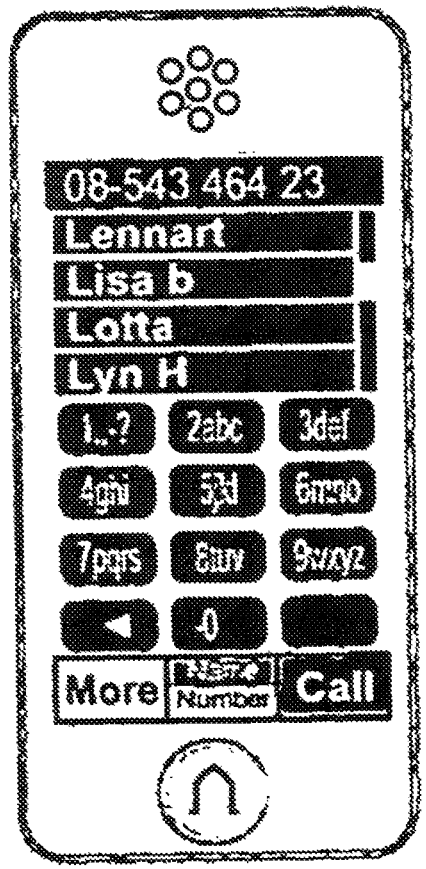
FIGS. 16-17 illustrate pressing the home key to return to the home display screen.
Figure 17:
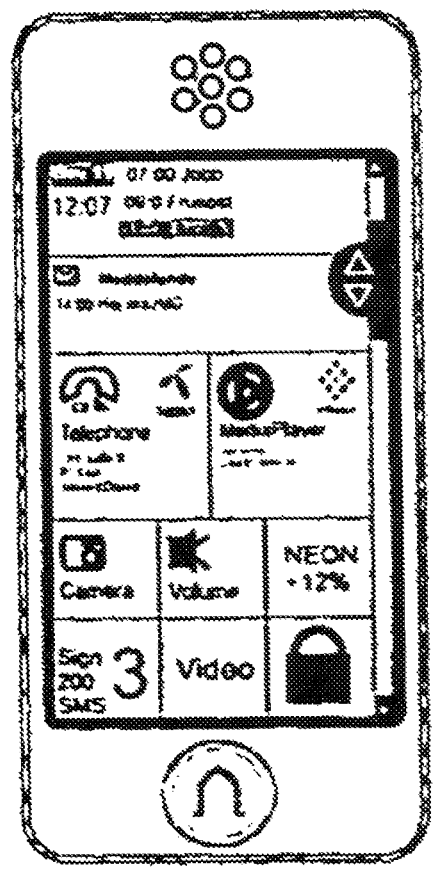

Yet further in accordance with an embodiment of the present invention, a touch screen for a phone captioned "Home/return from application" is shown in FIGS. 16-17. An application display screen is shown in FIG. 16, indicating that the user is running an application that substantially occupies the screen. A basic screen is shown in FIG. 17, for activating gadgets and applications. In order to return from the application screen (FIG. 16) to the basic screen (FIG. 17), the user activates the home key displayed at the bottom of the phone, such as by touching the home key. Tapping on the home key causes the open application to remain open, and causes the basic screen to display, thereby enabling launching additional applications. According to an alternative embodiment, tapping on the home key causes the open application to be closed.

Figure 18:
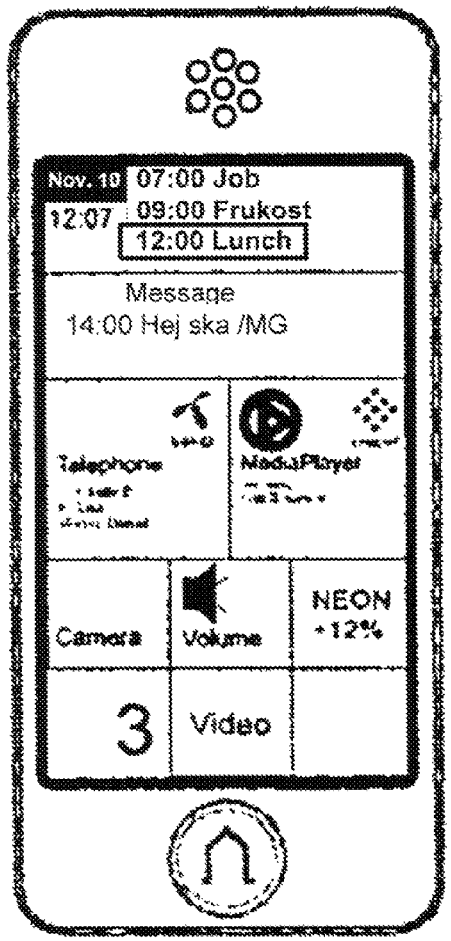

Moreover in accordance with an embodiment of the present invention, a touch screen for a phone captioned "Scroll alternatives" is shown in FIGS. 18-21. Four phones are displayed under the "Scroll alternatives" caption, each phone illustrating a different method and system for a touch-based user interface. Scrolling is useful when multiple gadgets are available for the user to activate or use, but not all of the gadgets are displayed on the screen at one time. In this case, the user can scroll to expose additional gadgets and to hide some of the previously visible gadgets. In FIG. 18, labeled "Alt 4", the user sweeps his finger or other interface input, such as inter alia a stylus, along the screen in a direction indicating that he would like to uncover additional gadgets and cover exposed gadgets. E.g., sweeping a finger across the width of the screen from right to left causes gadgets virtually located beyond the left screen border to be exposed, and causes gadgets previously located along the right screen border to be hidden. Similarly, sweeping a finger across the height of the screen from the bottom to top causes gadgets virtually located above the top edge of the display to be exposed, and gadgets previously located at the bottom edge of the screen to be hidden.

In FIG. 19 labeled "Alt 1", a scroll cursor is shown along the right edge of the screen. The user touches the cursor and makes a sliding gesture along the right edge of the screen to cause gadgets virtually located beyond the bottom edge of the screen to be exposed, and causes gadgets previously situated at the upper edge of the screen to be hidden.

In FIG. 20 labeled "Alt 2", a button gadget is shown with two opposite arrows at the lower right corner of the screen. The user selects this gadget by touching one of the arrows, which causes the screen display to scroll according to the direction of the touched arrow.

In FIG. 21 labeled "Alt 3", two arrow gadgets are shown at the top and bottom of the display screen. The user selects one of the two arrows, which causes the screen display to scroll according to the direction of the selected arrow.

Figure 22:
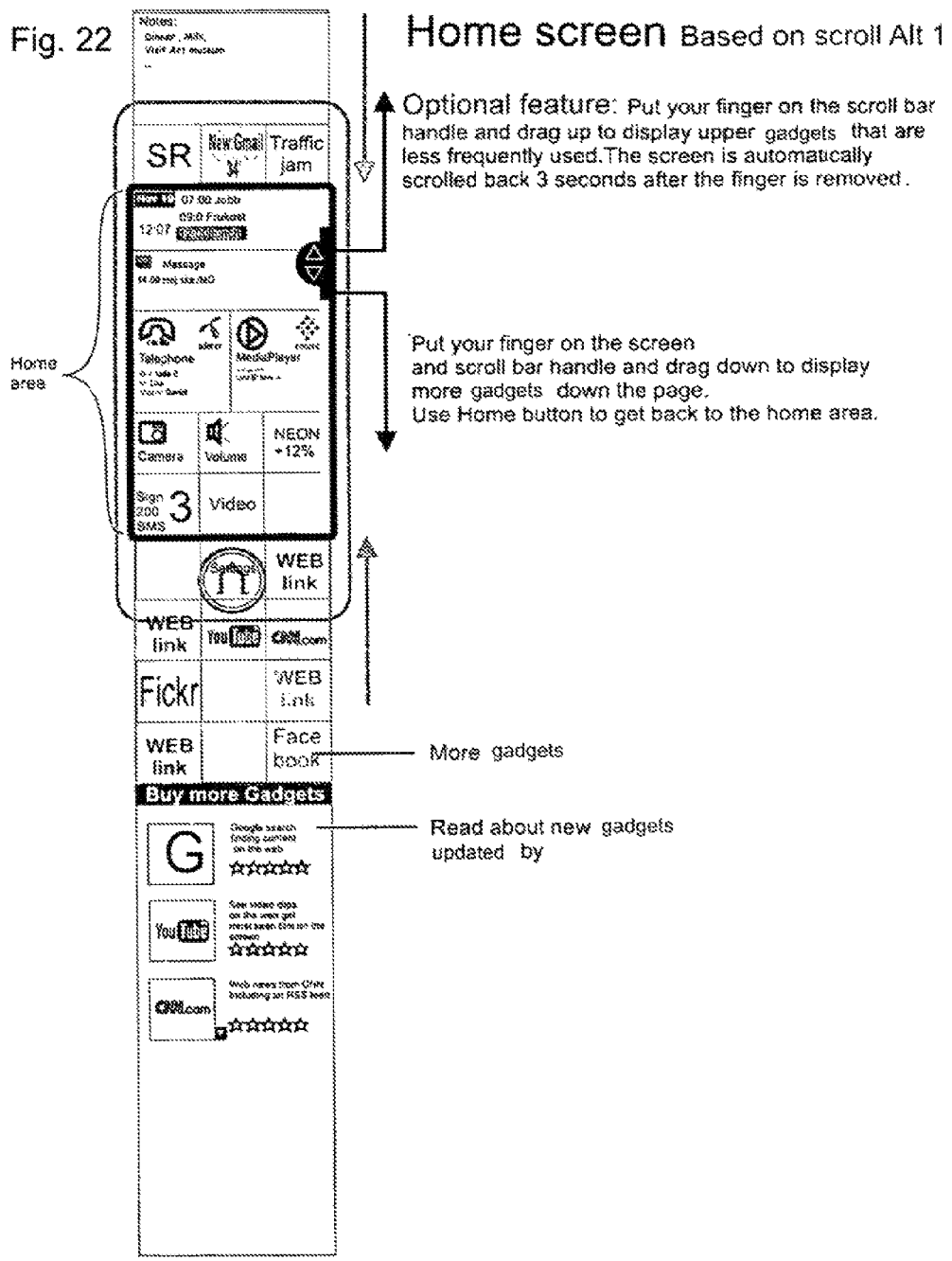
FIG. 22 illustrates scrolling the home display screen, in accordance with an embodiment of the present invention.

Additionally in accordance with an embodiment of the present invention, a touch screen for a phone captioned "Home screen" is shown in FIG. 22. A dark border indicates the physical limits of the display screen. Gadgets are shown extending above and below the screen, indicating virtual locations of additional gadgets. By scrolling, the user causes successive display of additional gadgets, substantially in the order in which they appear in their virtual locations. The original display is denoted in the figure as the "Home area". At the bottom of the gadget list is a series of links updated by external feeds, such as Internet websites, for installing new gadgets into the phone.

After the user scrolls to reveal additional gadgets and a specific time limit has elapsed, e.g., 3 seconds, the screen automatically returns to a default display, hiding recently exposed gadgets and revealing previously hidden gadgets. Such return to default display is of advantage for revealed gadgets that do not require extended viewing, such as, inter alia, a clock or a weather report. The return to default display obviates the need for the user to perform an action in order to return the screen to its initial display. Activating the home key after scrolling also returns the screen to its initial display, showing the originally displayed gadgets and hiding the recently revealed gadgets. Such return to initial display is graphically presented (i) by returning the original display completely, (ii) by fading in the original display over the current scrolled display, (iii) by gradually displacing the scrolled display with the original display, (iv) by graphically scrolling the display in reverse to the original display, or (v) by a combination of such presentations.

Figure 23:
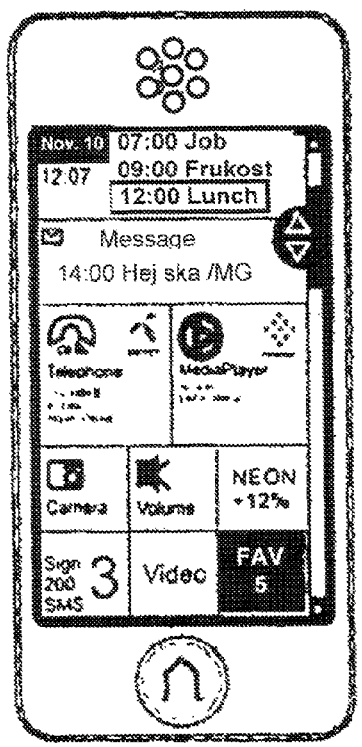
FIGS. 23-24 illustrate a Fav5 gadget, in accordance with an embodiment of the present invention.
Figure 24:

Further in accordance with an embodiment of the present invention, a touch screen for a phone captioned "Fav 5" is shown in FIGS. 23-24. Two phones are displayed under the "Fav 5" caption. In FIG. 23 the "Fav 5" gadget is shaded indicating that it is activated. FIG. 24 shows what this gadget does; namely, it displays five contacts that the user previously selected as his favorite five contacts. The "Fav 5" is a speed-dial interface for placing a call or otherwise contacting a person without having to navigate multiple menus or scroll through a large contact list. Each contact is shown with three buttons on the screen: "CALL", "SMS" and "MORE". By tapping on "CALL", a user causes initiation of a phone conversation with the contact. Similarly, by tapping on "SMS", a user causes initiation of an SMS message to the contact. By tapping on "MORE", a user is able to edit contact details and to edit the contact's position within the "Fav 5" gadget.

Figure 25:
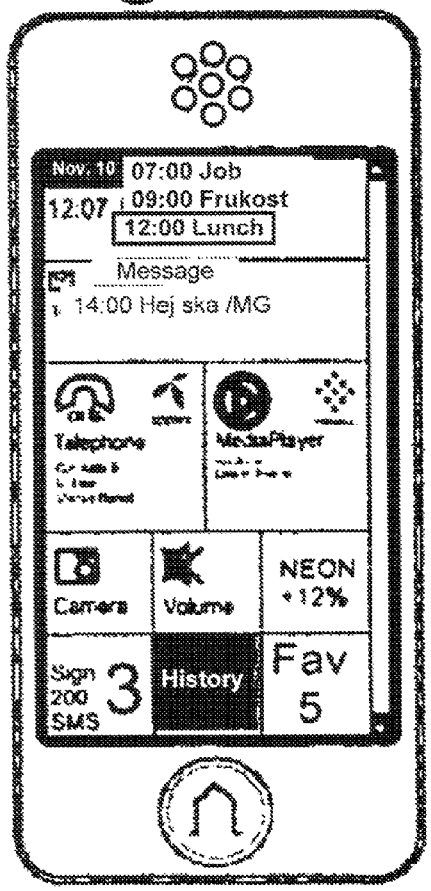
FIGS. 25-26 illustrate a History gadget, in accordance with an embodiment of the present invention.
Figure 26:

Further in accordance with an embodiment of the present invention, a touch screen for a phone captioned "History" is shown in FIGS. 25-26. Two phones are displayed under the "History" caption. A "history" gadget displays a user's call history, including incoming, outgoing and missed calls. The phone's user interface is similar to that of the "Fav 5" phone, including "CALL", "SMS" and "MORE" buttons for each contact. Optionally, an SMS history, for sent SMS messages, for received SMS messages, or for both sent and received SMS messages, is also included in the history list. The history list is generally longer than the number of contacts that fit within a single screen, and the user scrolls up and down the list to locate and select a desired contact.

Figure 27:
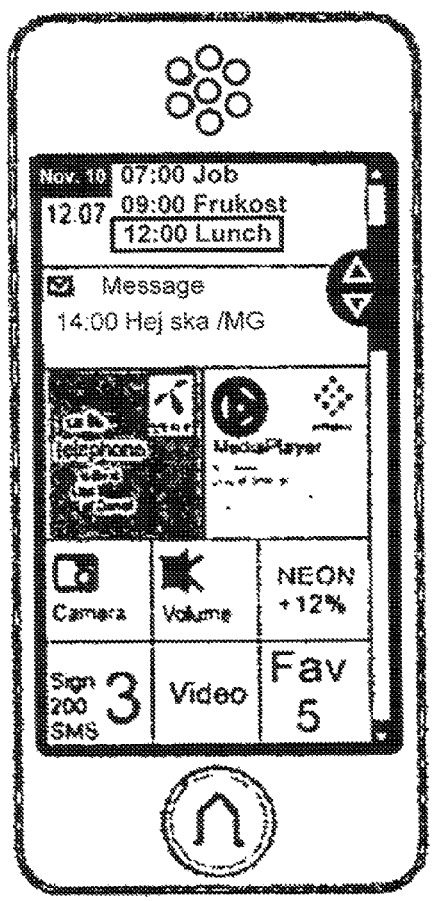
FIGS. 27-28 illustrate a Calling gadget, in accordance with an embodiment of the present invention.
Figure 28:
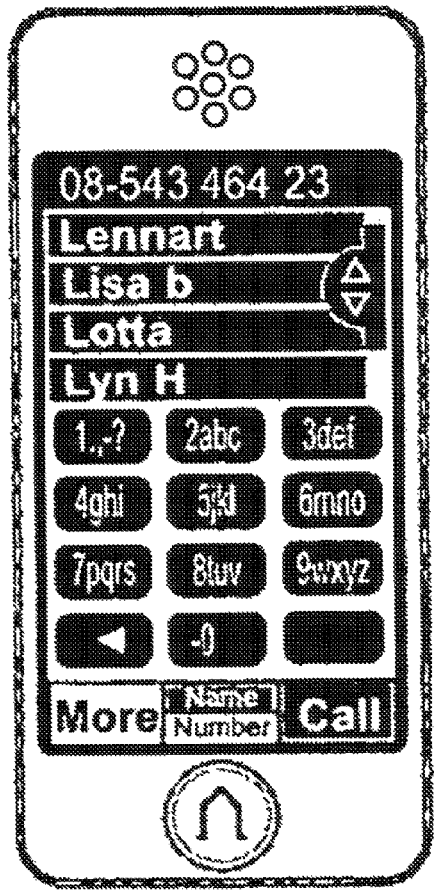

Yet further in accordance with an embodiment of the present invention, a touch screen for a phone captioned "Telephone" is shown in FIGS. 27-28. Two phones are displayed under the "Telephone" caption. A "Telephone" gadget is shown shaded in FIG. 27. The "Telephone" gadget displays the carrier name, signal strength and other relevant information. Activating the "Telephone" gadget, such as by tapping on the screen at the gadget location, causes the screen shown in FIG. 28 to appear. At the top of the display an active number is shown. The active number is entered by the user (i) using the keypad shown in the bottom half of the screen, or (ii) by selecting one of the contacts shown in the contact list in the upper half of the screen. The user scrolls the contact list to display a desired contact that is not currently exposed. The user also searches for a contact by entering the contact name using the alphanumeric keypad displayed in the bottom half of the screen. The user selects one of two modes, (i) number entry, or (ii) alphabetized search, by respectively selecting "Name" or "Number" at the bottom center of the screen. Selecting "Name" causes an alphabetic keypad to be displayed, and selecting "Number" causes a numerical keypad to be displayed. When a number or contact is selected, the user presses "Call" at the lower right corner of the screen to initiate the call.

Figure 29:
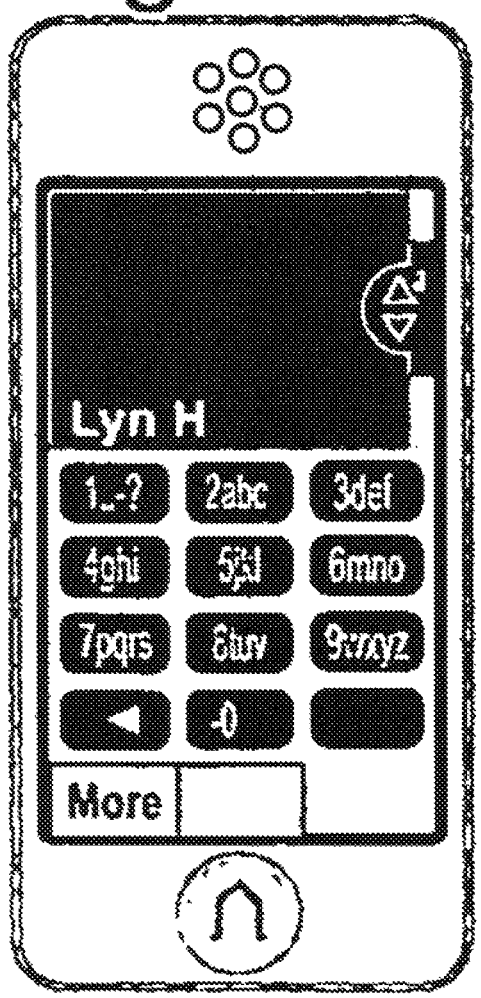
FIGS. 29-30 illustrate placing a call using a Calling gadget, in accordance with an embodiment of the present invention.
Figure 30:
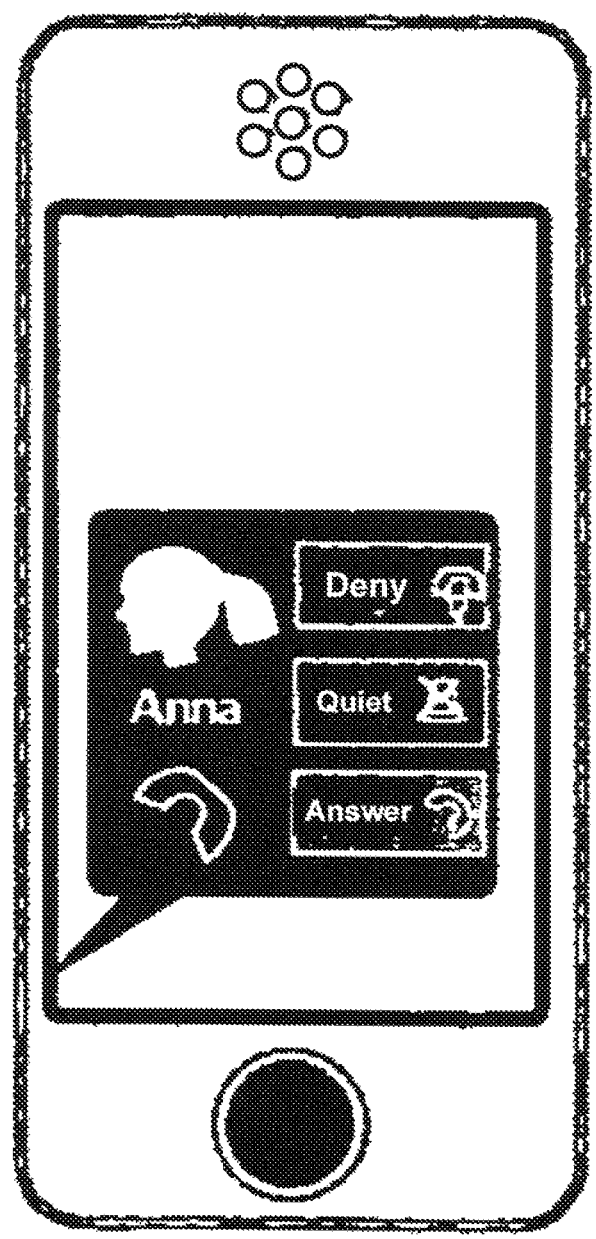

Moreover in accordance with an embodiment of the present invention, a touch screen for a phone captioned "Active call" is shown in FIGS. 29-30. Two phones are displayed under the "Active call" caption. The phones are displayed during an initiated call. FIG. 29 is presented for outgoing calls. The contact name occupies the entire upper half of the screen, for clear display of who is being called. Pressing on the "More" button enables call options such as mute and hold, and also enables editing an active contact's details, sending an SMS and other functions.

FIG. 30 is presented for incoming calls, which are displayed as a callout overlaying the existing screen display. Such overlay may be a blended overlay, or a complete overlay. The callout stretches across the screen and is presented in an animated fashion, such as wiggling. In addition to the identity of the caller, three buttons, "ANSWER", "DENY" and "QUIET" are presented to respectively answer the call, reject the call or mute the ring.

Figure 31:
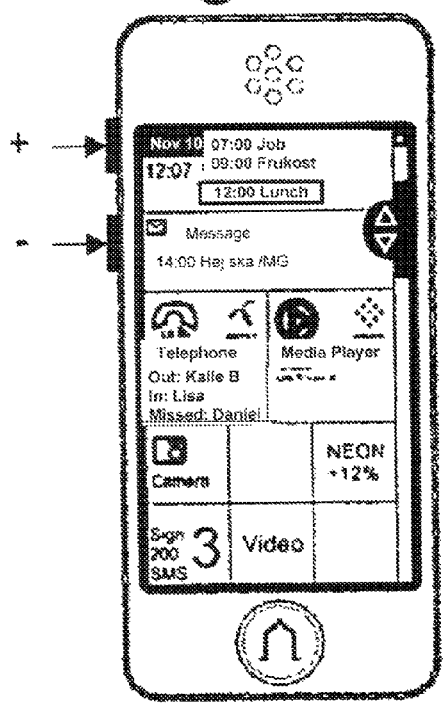
FIGS. 31-32 illustrate volume control, in accordance with an embodiment of the present invention.
Figure 32:
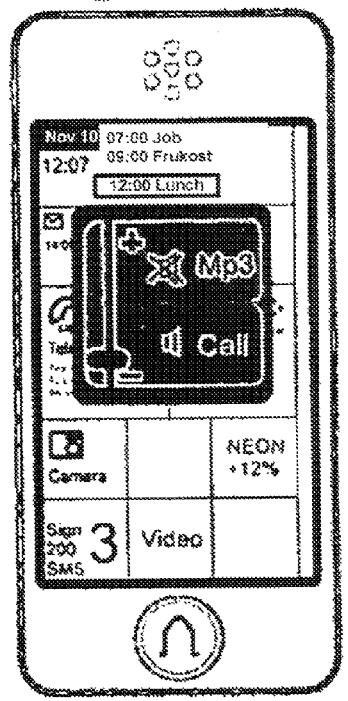

Additionally in accordance with an embodiment of the present invention, a touch screen for a phone captioned "Volume" is shown in FIGS. 31-32. Two phones are displayed under the "Volume" caption. FIG. 31 includes "+" and "−" volume buttons on the left edge of the phone. When one of the buttons is pressed, a "volume" gadget appears on screen is shown in FIG. 32. The user scrolls within the "volume" gadget to adjust the magnitude of volume and to select a sound source. Two sound sources are shown in FIG. 32; namely, "Mp3" and "Call". The "volume" gadget disappears after it is not engaged by the user for a designated time period, such as four seconds. The "volume" gadget disappears with an animated flourish such as, inter alia, ducking into a corner of the screen before disappearing, fading, shimmering, or a combination thereof.

Figure 33:
FIGS. 33-34 illustrate an MP3 player gadget, in accordance with an embodiment of the present invention.
Figure 34:
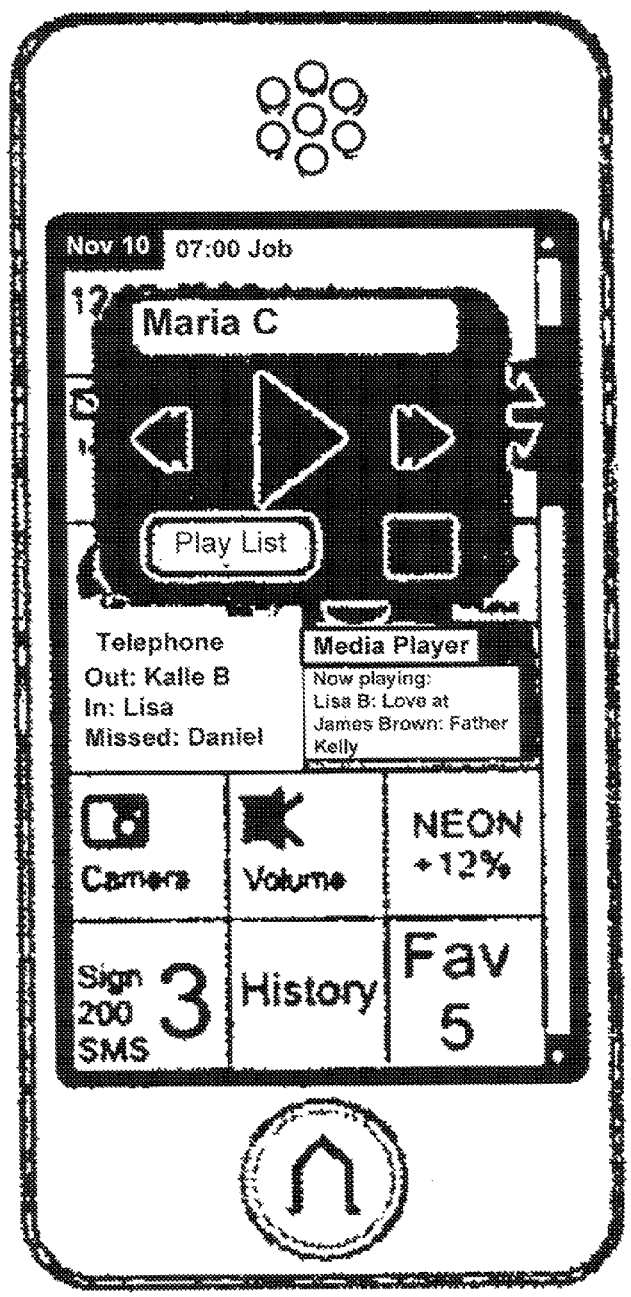

Additionally in accordance with an embodiment of the present invention, a touch screen for a phone captioned "Mp3 player" is shown in FIGS. 33-34. Two phones are displayed under the "Mp3 player" caption. FIG. 33 includes an "Mp3" gadget. The "Mp3 gadget" operates similarly to the "volume" gadget, in that it disappears after it is not engaged by the user for a designated time period. The "play list" button displays a playlist of songs (not shown). The active song, indicated in FIG. 34 as "Maria C" is listed at the top, and buttons are provided for stop, play/pause, forward and backward.

Figure 35:
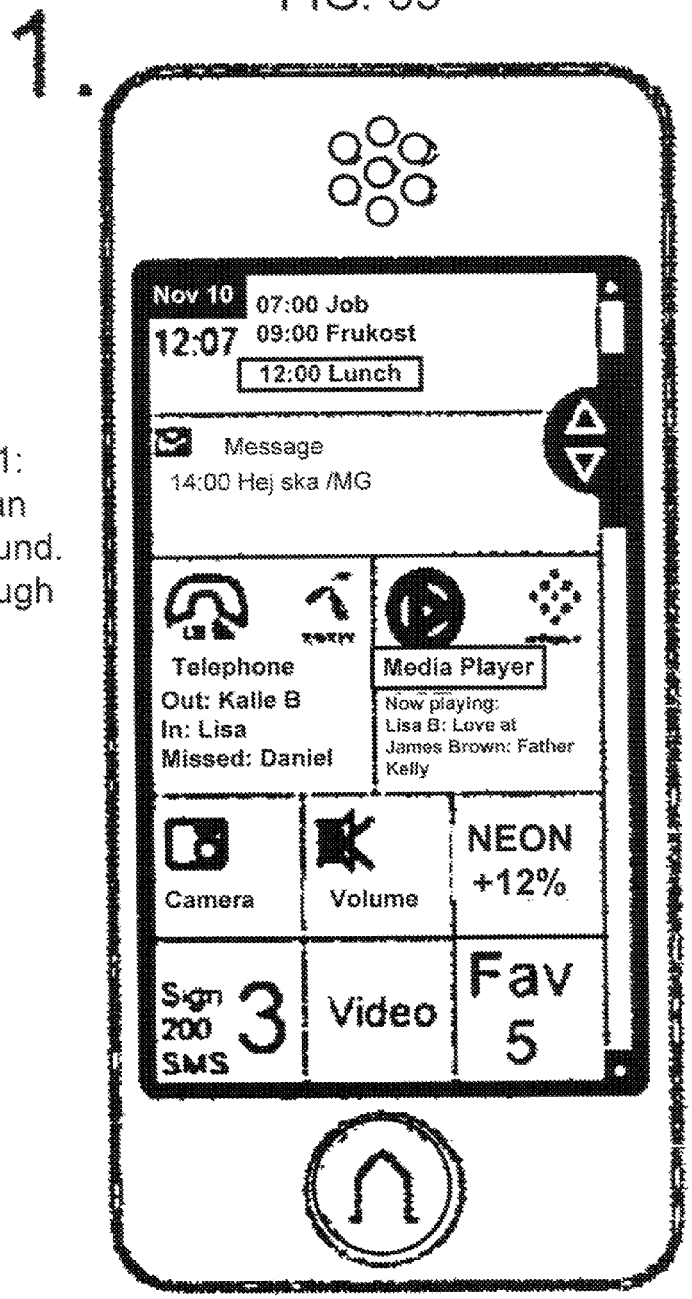
FIGS. 35-37 illustrate an operator promotion gadget, in accordance with an embodiment of the present invention.
Figure 36:
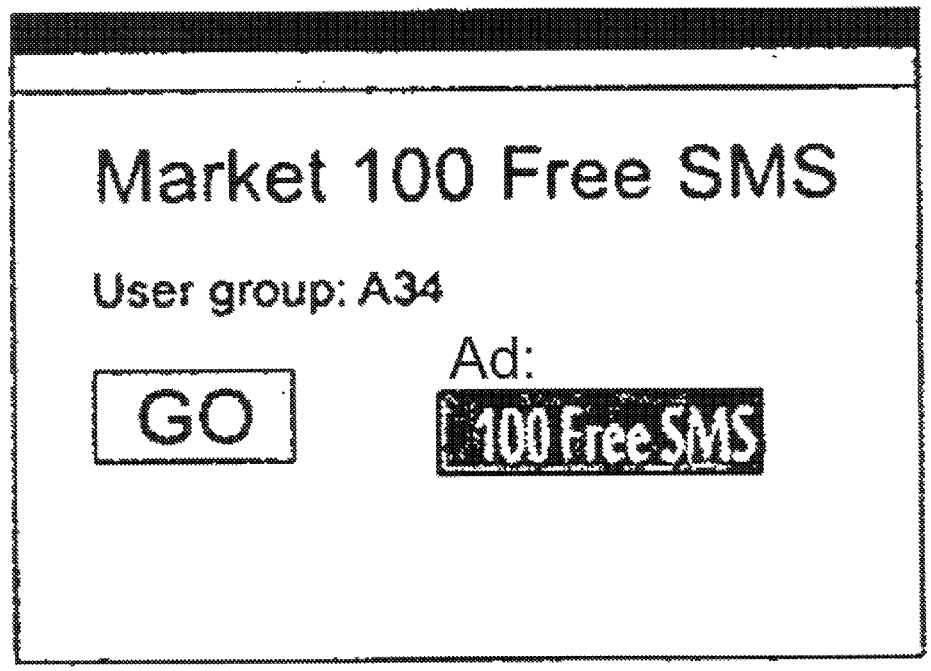
Figure 37:

Further in accordance with an embodiment of the present invention, a touch screen for a phone captioned "Operator ad" is shown in FIGS. 35-37. The "Operator ad" screen enables presentation of advertising offerings on the phone. Two phones are displayed under the "Operator ad" caption. FIG. 35 is presented prior to displaying an offering. FIG. 36 is a pop-up window that is overlaid on at least a portion of the screen. The user presses "GO" to activate the offer. FIG. 37 includes, as its topmost gadget, a display for an offering of 100 free SMS messages. The display for the offering displaces the topmost gadget that was previously displayed in FIG. 35, and the user may scroll the display, as described hereinabove, in order to view the displaced gadget. Tapping on the offering activates the gadget and causes inter alia an operator webpage or Java application to open. When the user activates the offering, a payment may be generated for the phone manufacturer, reseller or other vendor.

Figure 38:
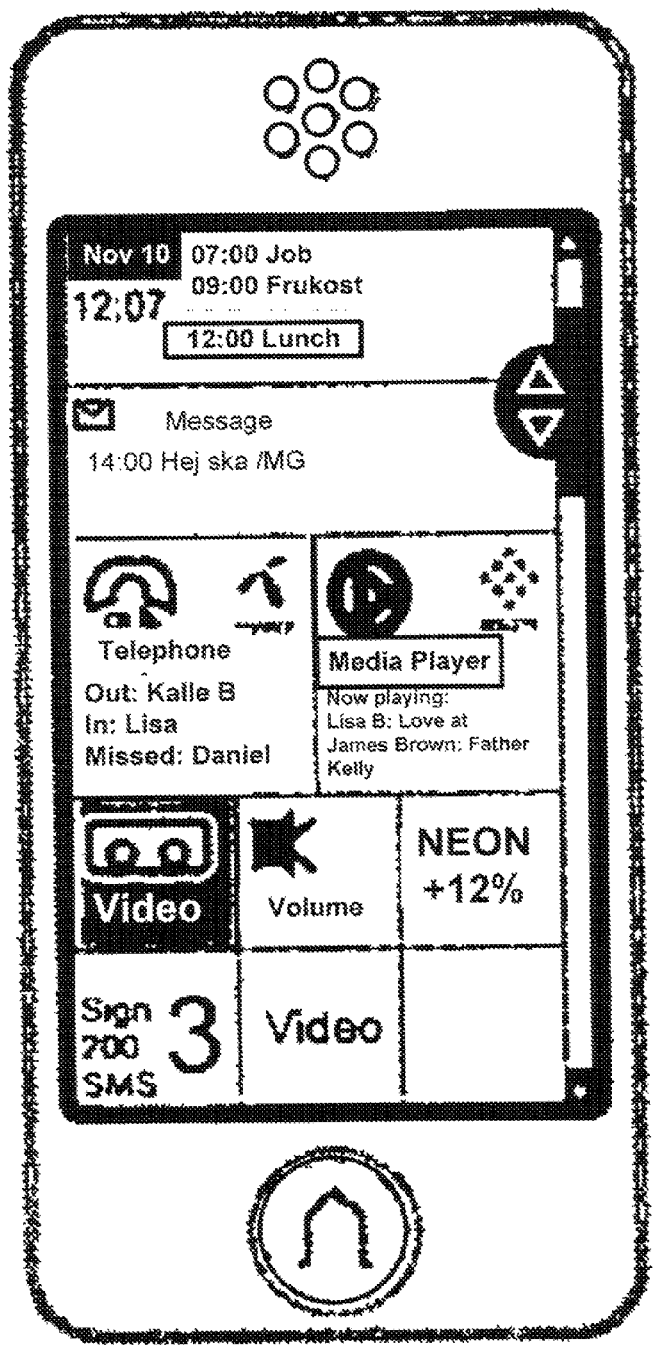
FIGS. 38-39 illustrate a video player gadget, in accordance with an embodiment of the present invention.
Figure 39:
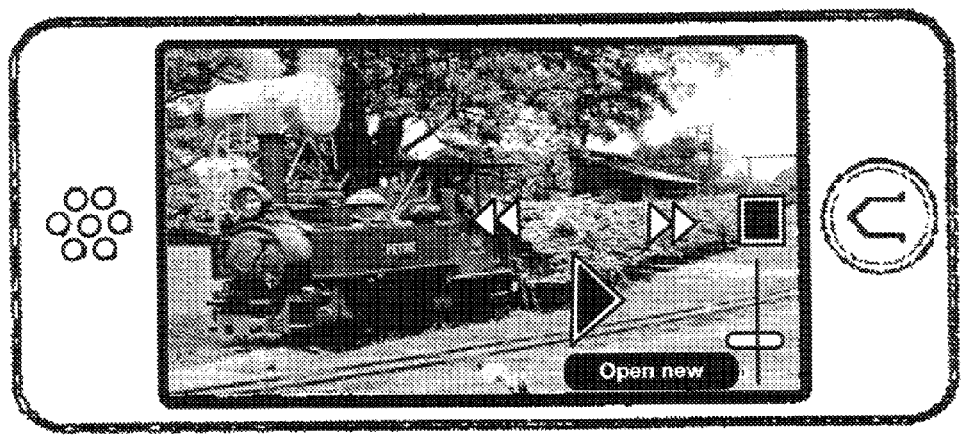

Yet further in accordance with an embodiment of the present invention, a touch screen for a phone captioned "Video" is shown in FIGS. 38-39. Two phones are displayed under the "Video" caption. A "Video" gadget is shown shaded in FIG. 38. Activating the "Video" gadget causes a video display screen to open, as shown in FIG. 39. Video controls such as play/pause, stop, volume control and open new video file, are provided on screen in FIG. 39. When the controls are not engaged by the user for a designated time period, they disappear, either directly or with an audio or visual presentation effect such as fading, shimmering, shrinking, ducking into a corner of the screen, or a combination thereof.

Figure 40:
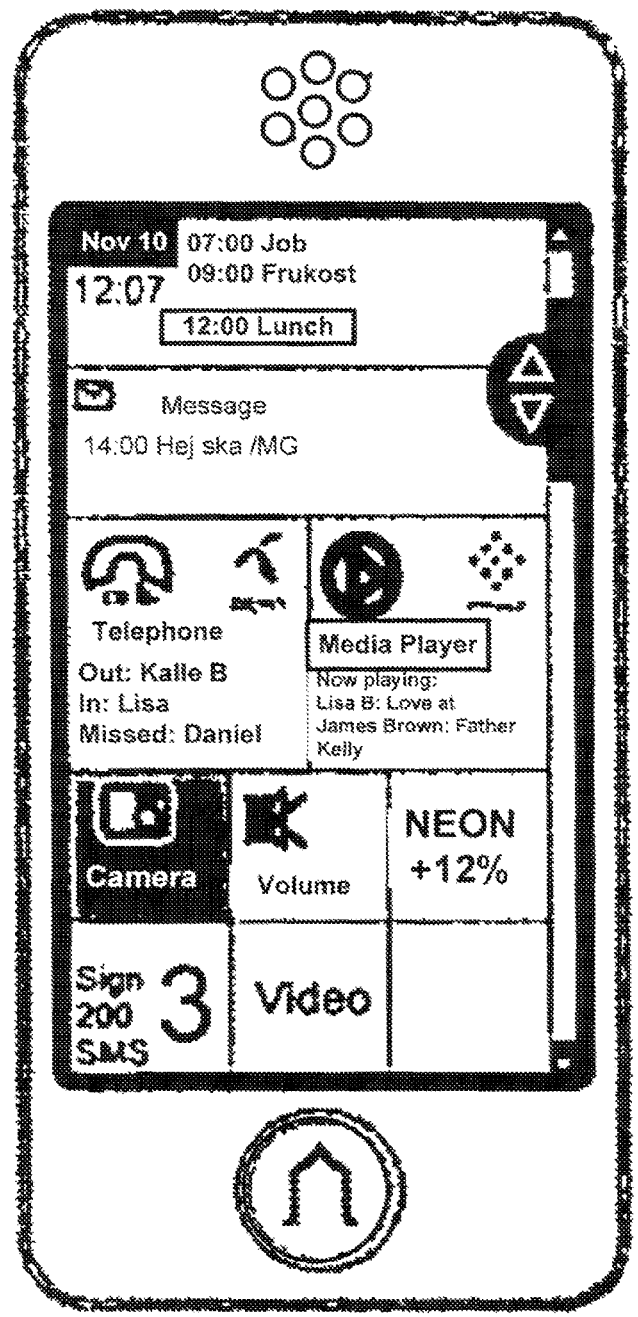
FIGS. 40-42 illustrate a camera gadget and shortcut buttons provided when the camera gadget is activated, in accordance with an embodiment of the present invention.
Figure 41:
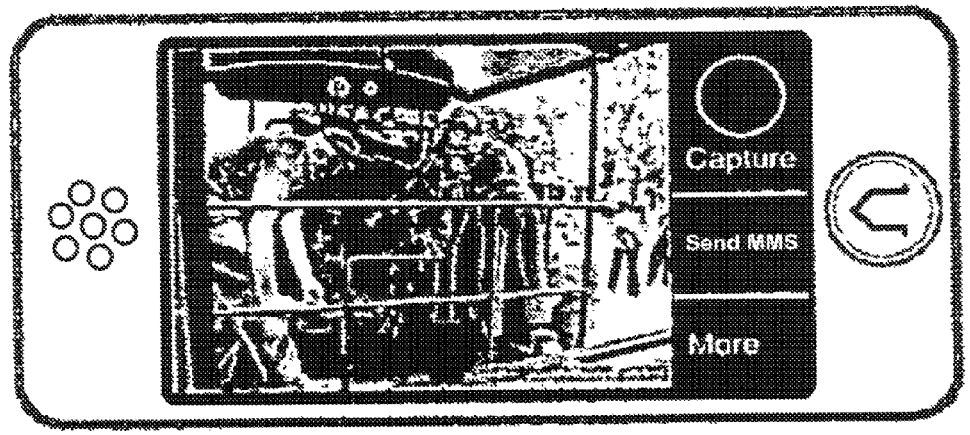
Figure 42:
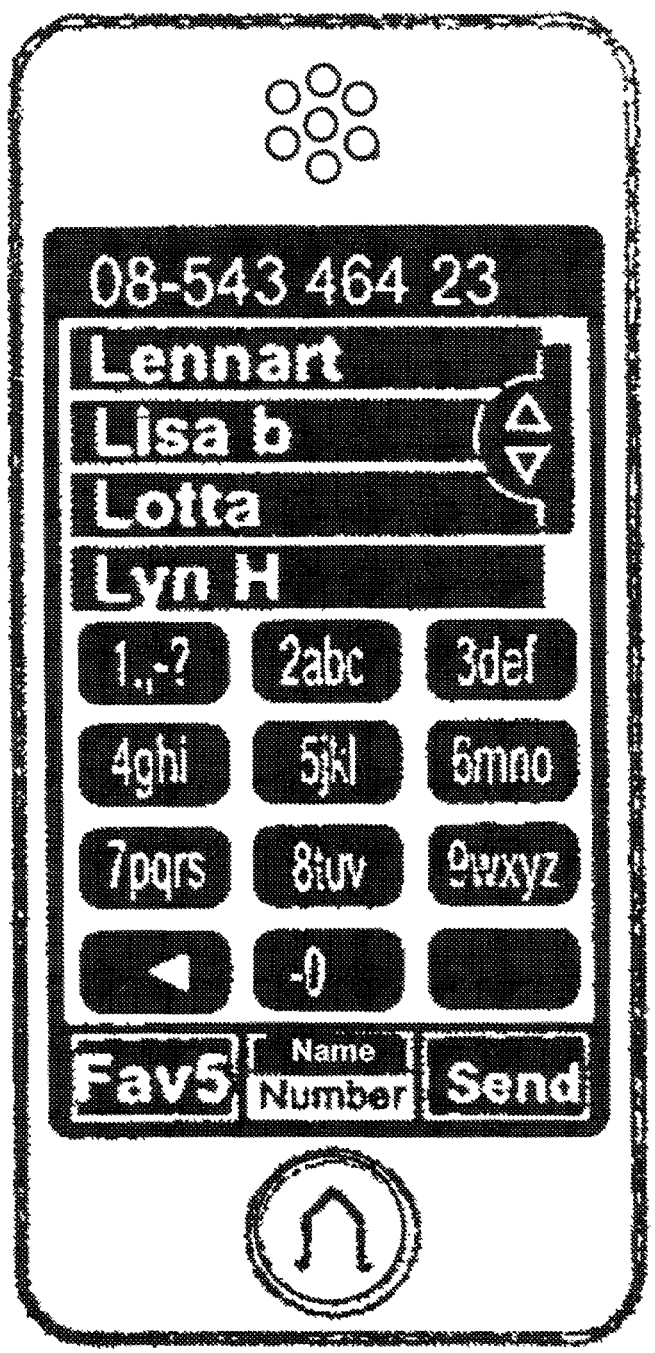

Yet further in accordance with an embodiment of the present invention, a touch screen for a phone captioned "Camera" is shown in FIGS. 40-42. Three phones are displayed under the "Camera" caption. A "camera" gadget is shown shaded in FIG. 40. When the user activates the "Camera" gadget, a viewfinder is presented, as shown in FIG. 41. The right side of the viewfinder displays controls for capturing an image, sending an image via multi-media message (MMS), and a "MORE" button for enabling additional options, such as inter alia changing camera settings, changing image resolution, setting camera effects and applying image processing functions. If the user selects "Send MMS", an interface for selecting at least one recipient for the MMS is displayed. FIG. 42 illustrates an interface of this nature, enabling entering a phone number using the keypad in the bottom half of the screen, or selecting a contact from a list shown at the top help of the screen. The user can also access his "FAV 5" gadget to quickly access contacts, as described hereinabove. When the user selects "Send" the image is sent via MMS to the selected at least one recipient.

Figure 43:
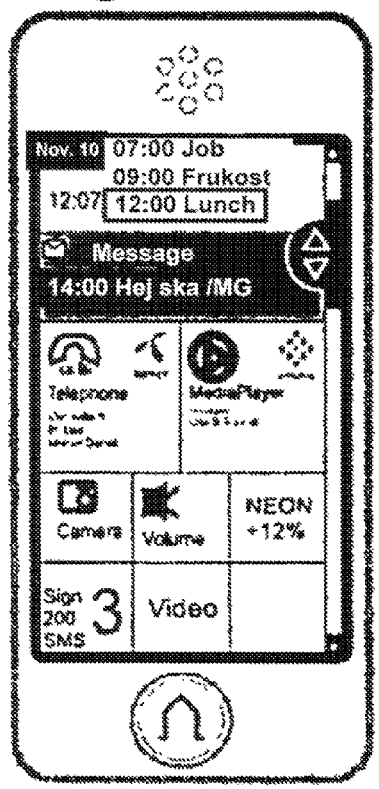
FIGS. 43-45 illustrate an SMS gadget and shortcut buttons provided when the SMS gadget is activated, in accordance with an embodiment of the present invention.
Figure 44:
Figure 45:

Yet further in accordance with an embodiment of the present invention, a touch screen for a phone captioned "Messaging SMS" is shown in FIGS. 43-45. Three phones are displayed under the "Messaging SMS" caption. An "SMS" gadget for sending and viewing SMS messages is shown shaded in FIG. 43, indicating that the user has activated this gadget, for example by tapping on it. Activating the "SMS" gadget causes an interface for viewing and composing SMS messages to open, as illustrated in FIG. 44. The user scrolls down the list of messages arranged in an order, such as (i) by date and time received, (ii) alphabetically according to the sender name or subject, (iii) by thread of correspondence grouping all messages belonging to a single conversation together, or such other sorting method or combination thereof. Displayed with each message are the time of the message, the sender and the sender's phone number. To compose a new message the user activates the "Empty message button" shown at the top of the list in FIG. 44. To open a message the user selects it from the list and selects "Open" in the bottom right corner of the screen. To view a list of sent messages, the user selects the "Sent" button shown in the bottom center of the screen. To open drafts of messages, the user selects the "Draft" button shown at the bottom center of the screen. Selecting the "More" button shown at the bottom left of the screen causes an interface for more options to open, including inter alia (i) configuring how the list of messages is displayed, (ii) configuring how messages are sorted, (iii) deleting messages, and (iv) saving messages to designated folders. In an alternative embodiment, the interface for accessing and viewing messages operates substantially as a call history interface.

FIG. 45 shows an interface for composing a new message. When the message being composed is a reply to a previously received message, the previously received message is displayed, for example, inside a callout graphic as shown in the rightmost phone. A QWERTY keyboard interface is provided for composing a new message. In FIG. 45, the new message is shown at the right side of the white area of the display following the name of the recipient, "To Amber:". Selecting the "Send" button causes the new message to be sent to the recipient. Selecting the "New" button causes a new message interface to open. Selecting "More" enables additional options. Selecting the "123" button at the bottom left of the keypad shown in the figure toggles the keypad from QWERTY to a numeric keypad. Other types of keypads are also supported and toggled by additional presses of the "123" button. Whenever a new keypad is displayed, the "123" toggle button displays an indicator of the next keyboard to be displayed. For example, when the next press of the toggle button will cause an English keypad to be presented, the toggle button will display the letters "En" instead of "123". If the next press of the toggle button will cause an English keypad to be presented and the T9 language prediction to be turned on, the toggle button will display the characters "T9 En".

Figure 46:
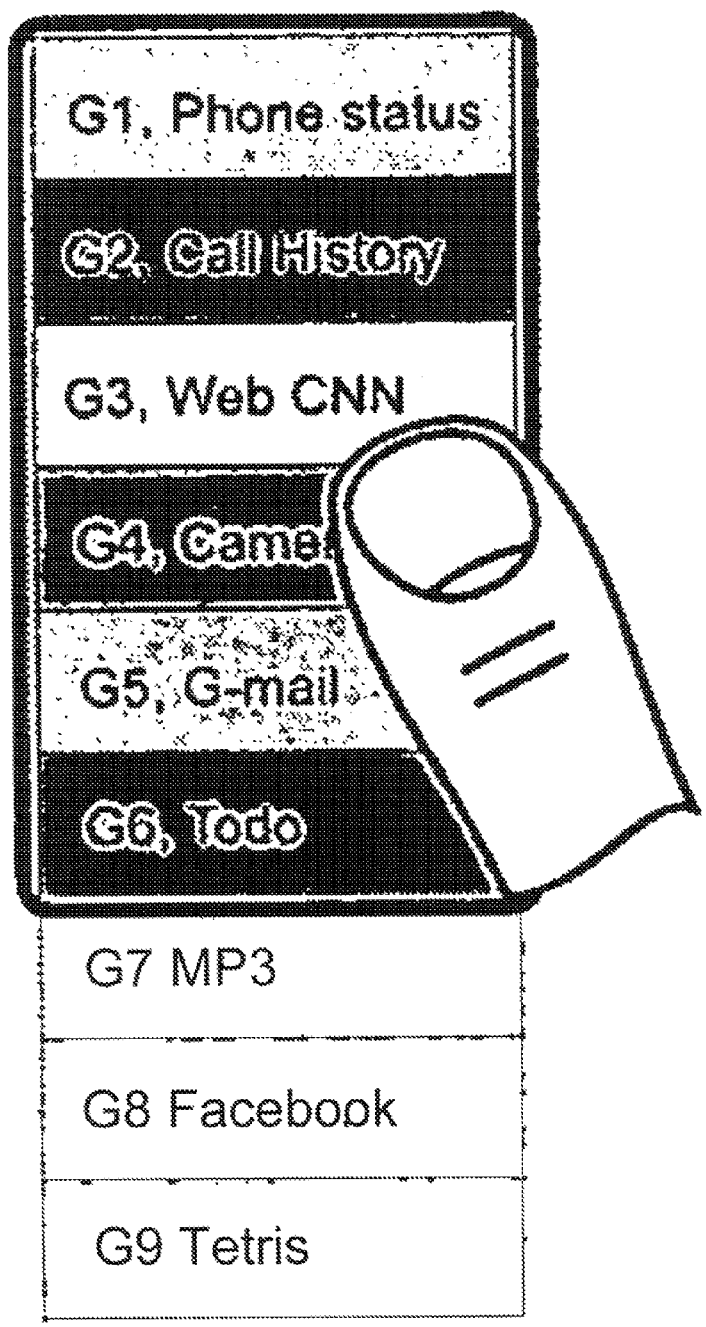

FIGS. 46-54 show a series of nine phones, to illustrate a user interface. Each phone in FIGS. 46-54 shows a finger and a phone display containing an item "G3". On a device having a limited display area, an open application, such as a web browser, occupies a large portion of the display area. This prevents displaying additional useful information to the user from other applications, gadgets and web sessions, at the same time. According to an embodiment of the present invention, gadgets are arranged in a contiguous series or stack, as shown in FIG. 46 labeled "Home screen", with gadgets G1-G6 displayed on screen and additional gadgets G7-G9 virtually situated below the bottom edge of the screen. The user scrolls the sequence of gadgets, revealing gadgets previously virtually situated beyond one edge of the screen or display window, and hiding gadgets previously situated at an opposite edge of the screen or display window.

Figure 47:
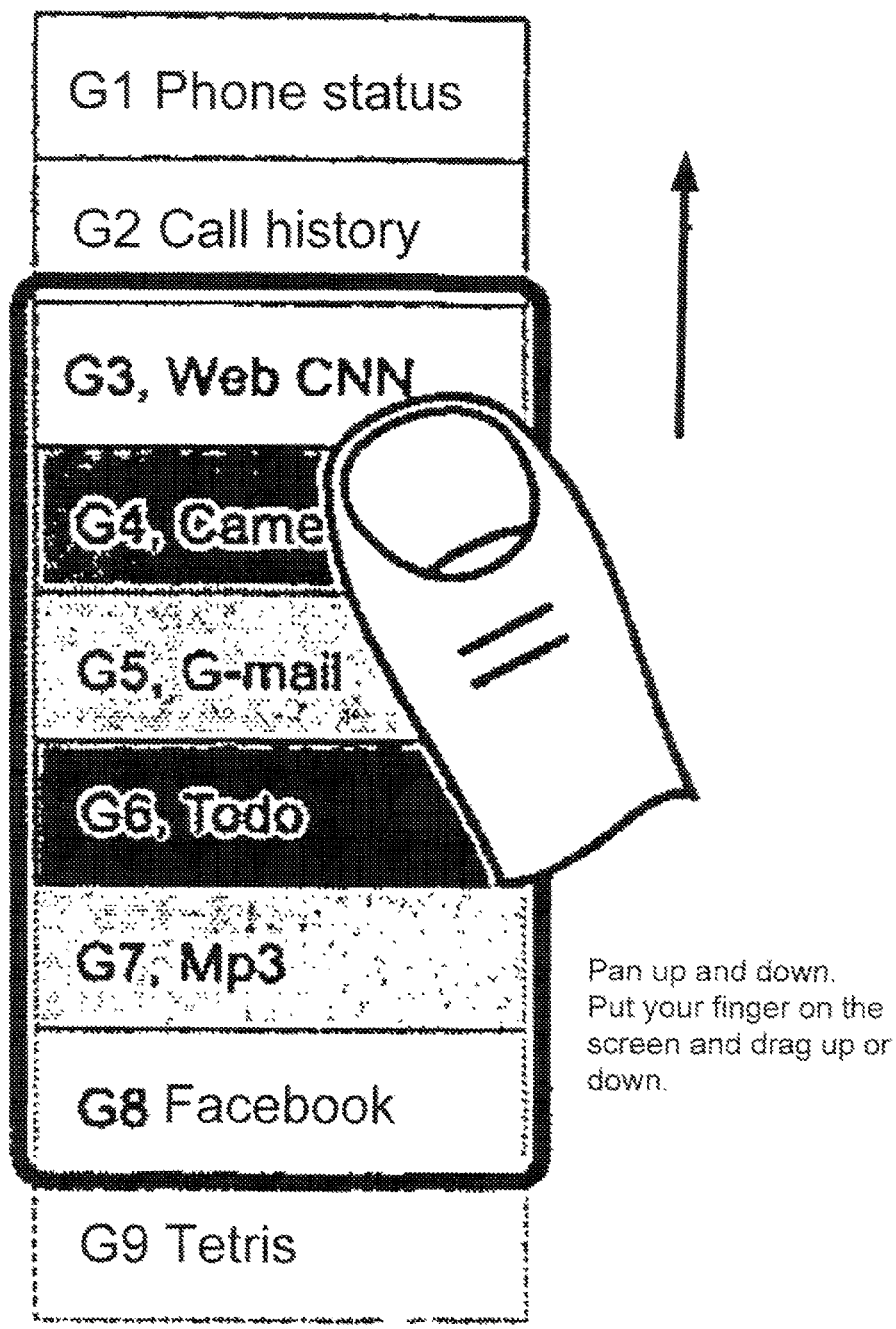
Figure 48:
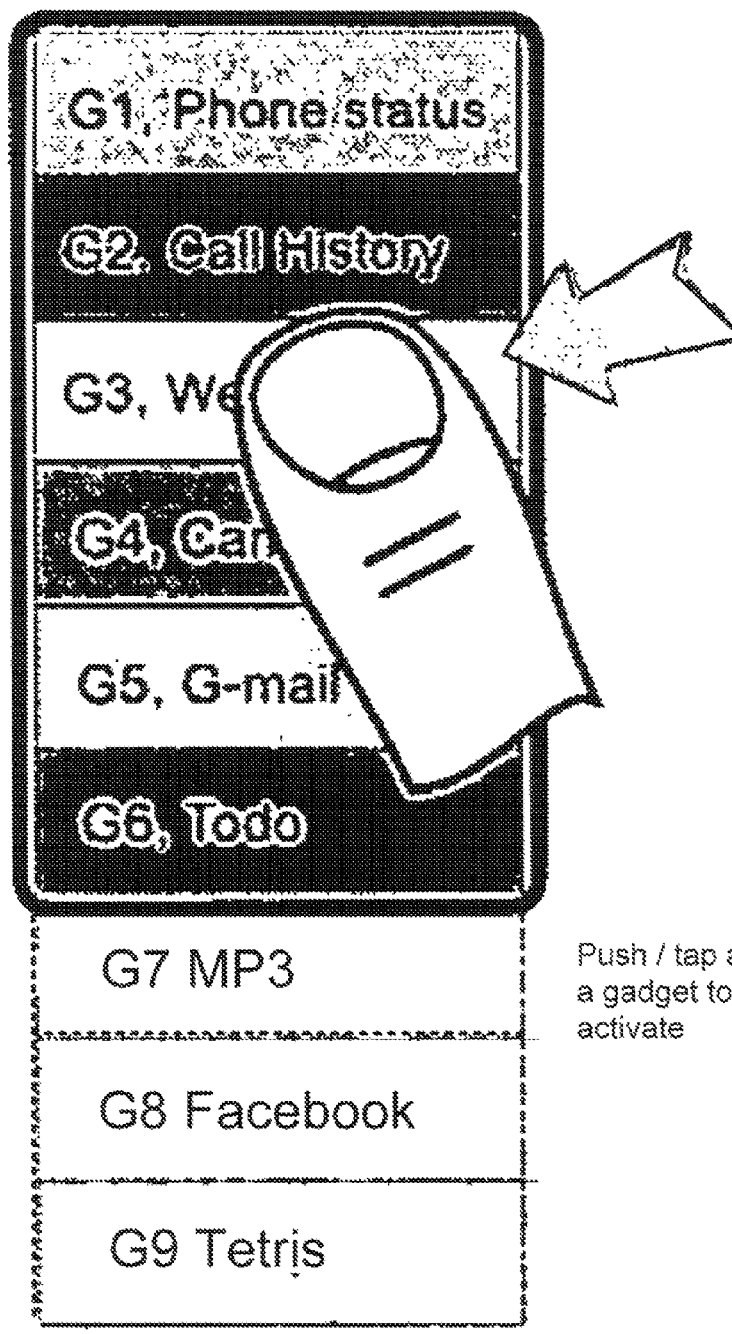

The effect of the scrolling activity is illustrated in FIG. 47 labeled "Pan home screen". The user sweeps his finger in an upward direction along the length of the screen to cause the display to scroll, and thereby reveal gadgets virtually situated in the opposite direction of the user's finger sweep. Comparing FIG. 47 to FIG. 46, it is seen that the scroll action has caused gadgets G1 and G2 to be hidden, and gadgets G7 and G8 to be revealed. G3-G6 are correspondingly displayed closer to the upper edge of the screen, in accordance with the scrolling action.

Figure 50:
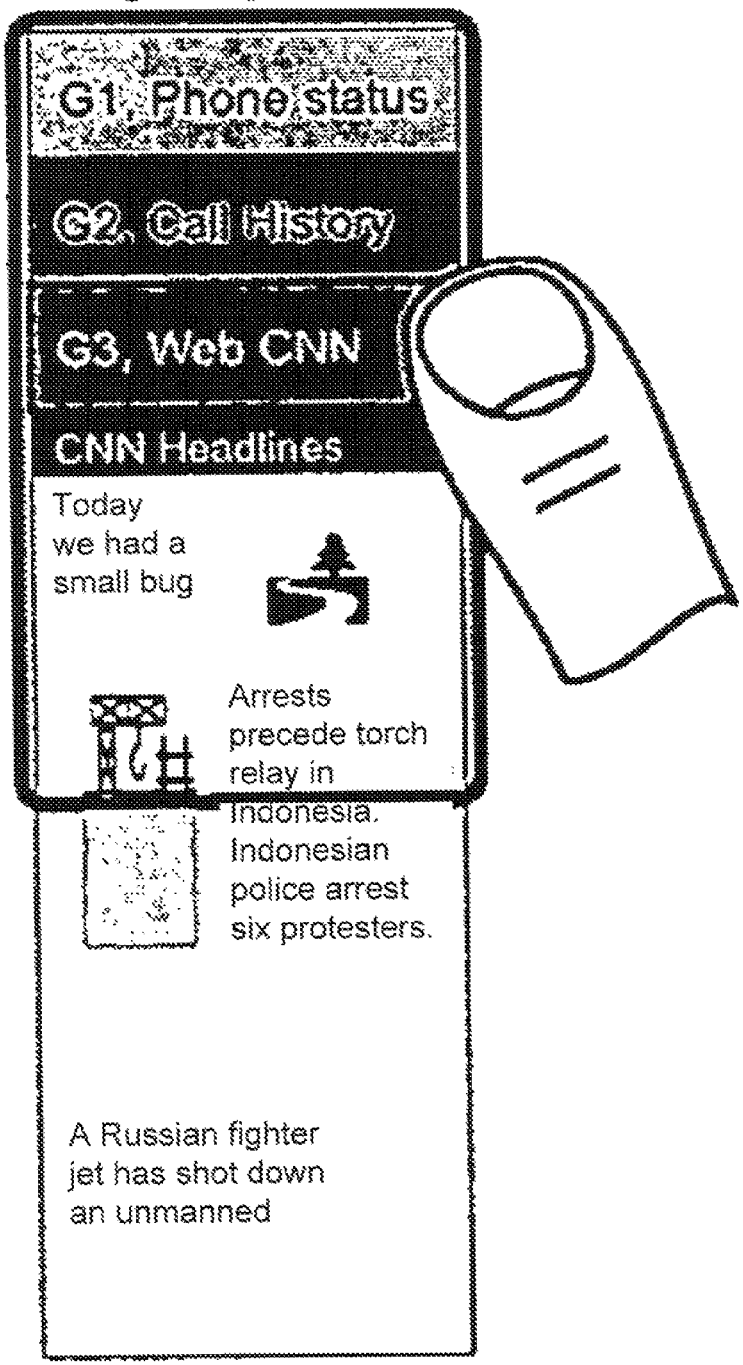
Figure 51:
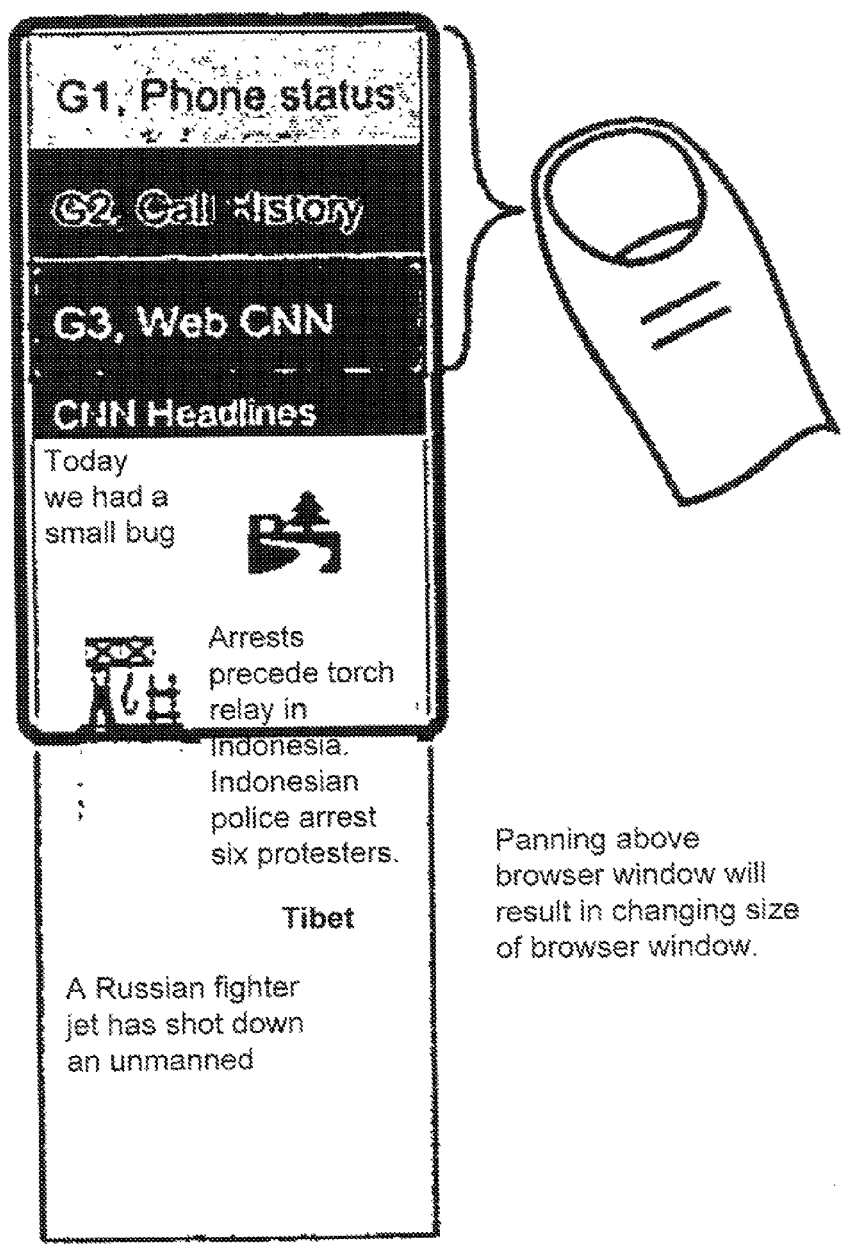
Figure 52:
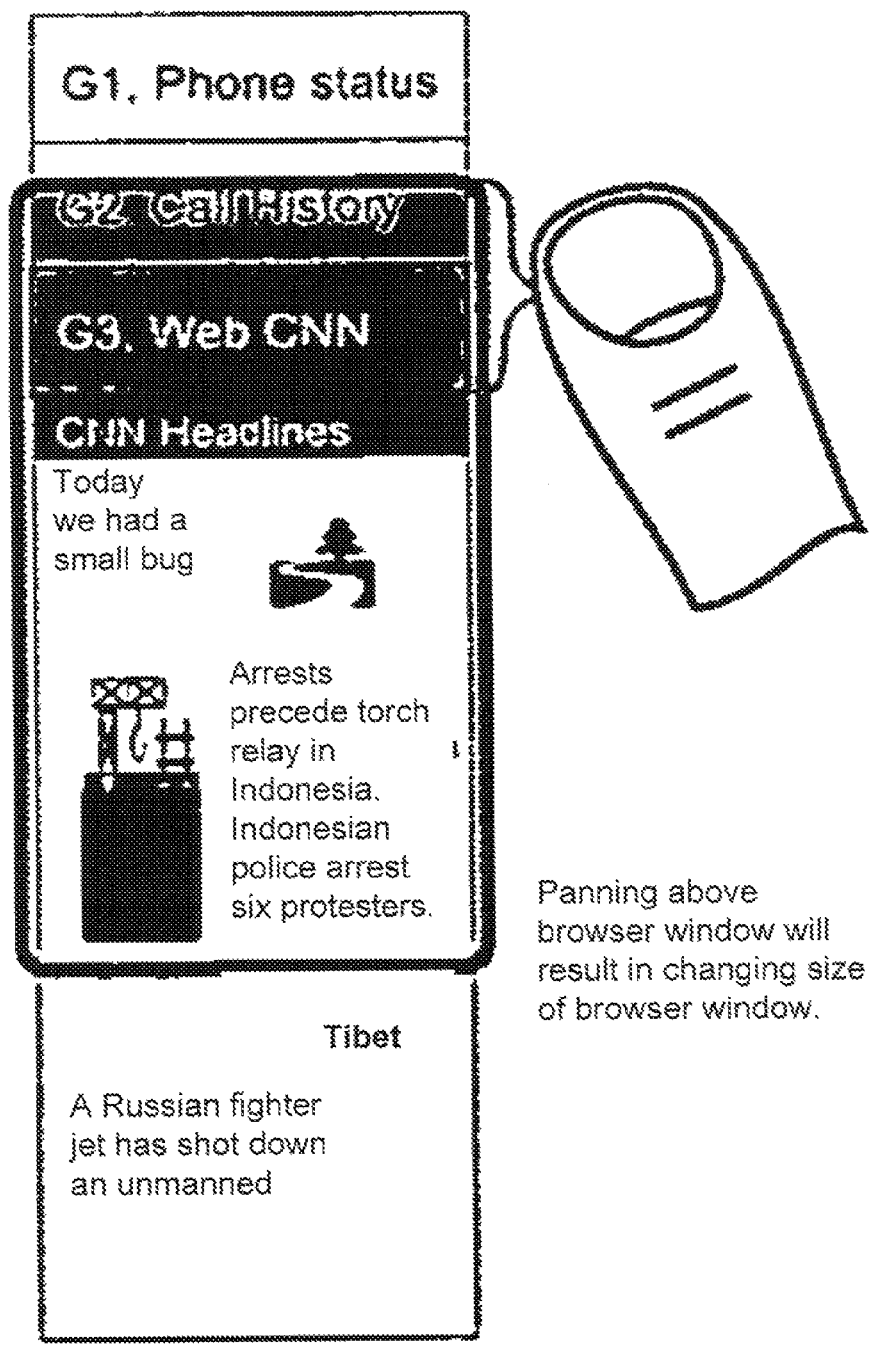
Figure 53:
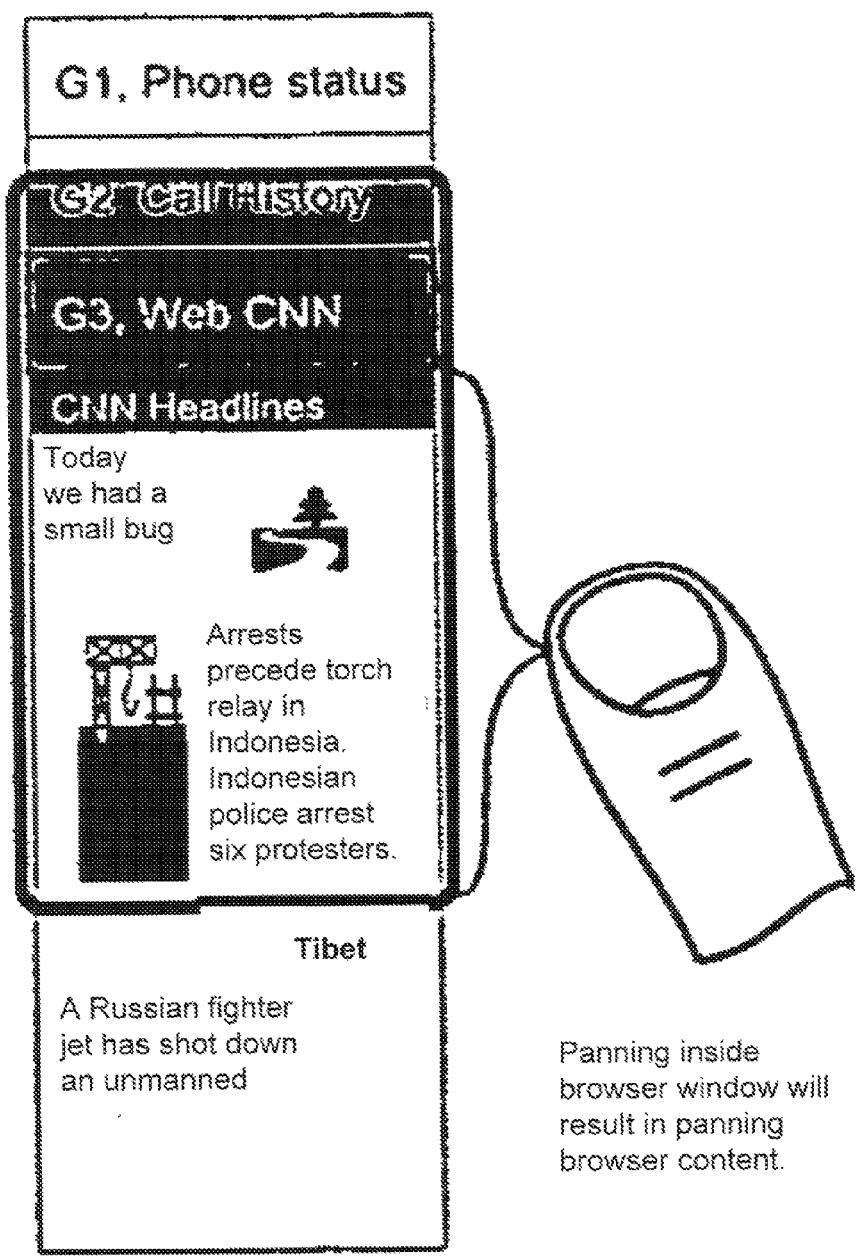
Figure 54:
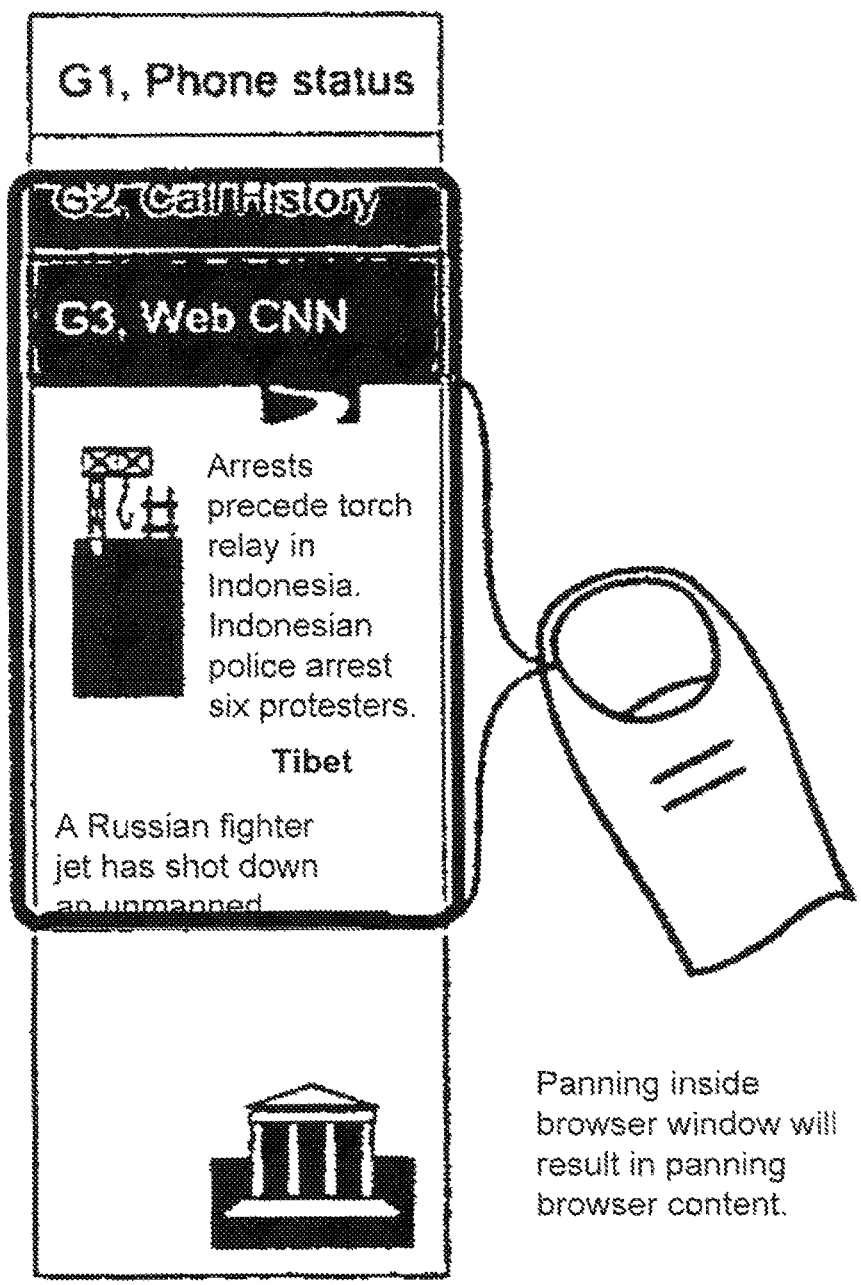

When a gadget is activated, for example by tapping on the screen position associated with the gadget, the display area of the selected gadget extends in one direction, for example down-screen to the bottom of the screen or beyond the bottom of the screen. This extension is shown in FIG. 50 labeled "open gadget/browser". In this figure, a "CNN headlines" gadget is shown extending beyond the bottom edge of the screen. When a gadget is open, the user has two scrolling options: (i) scroll the stack of gadgets, and (ii) scroll the window of the open gadget. The initial position of the user's scrolling finger determines which scrolling option will occur. When the initial position of the scrolling finger is at a height of the screen aligned with un-open gadgets in the stack of gadgets, the option to scroll the stack of gadgets is active. This is illustrated in FIGS. 51-52 labeled "Panning Gadget." FIG. 51 shows the initial scrolling finger position aligned with un-open gadgets in the gadget stack. FIG. 52 illustrates sliding the finger in the direction of the top of the screen, thereby shifting the entire gadget stack up. It is noted that shifting also shifts the visible portion of the open gadget as an integral part of the gadget stack. The second option of scrolling only the active gadget is illustrated in FIGS. 53-54 labeled "Panning Web." In FIG. 53 the initial position of the scrolling finger is shown aligned with an area of the screen displaying the open gadget. FIG. 54 illustrates the scrolling action whereby only the data inside the open gadget is shifted in response to sweeping the finger towards the top of the screen, as indicated by the arrow; the stack of unopened gadgets is not shifted.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A non-transitory computer readable medium storing program code which, when executed by a processor of a mobile phone comprising a touch sensitive display, causes the mobile phone to present a user interface for accessing a plurality of applications, wherein the user interface:

provides a plurality of applications and gadgets associated therewith, each such application running on the mobile phone in an activated state and in a non-activated state whereby, in its activated state, such application presents a graphical user interface (GUI) and runs interactively via the GUI, and, in its non-activated state, such application presents its associated gadget and runs non-interactively to present, within its associated gadget, dynamically generated information related to such application, and whereby tapping anywhere in its associated gadget causes such application to transition to its activated state;

initializes the plurality of applications in their non-activated states when the phone is turned on;

arranges the gadgets in a layout that is larger than the display, whereby some of the gadgets are in the display and others of the gadgets are out of the display; and when an application transitions to its activated state:
  alters the layout, comprising:
    displacing some of the gadgets from in the display to out of the display; and
    replacing the displaced gadgets with a window for the GUI of the activated application, the GUI being larger than the window, and the window being larger than the gadget associated with the activated application;
  pans the GUI of the activated application within the window to bring a portion of the GUI into the window and to move another portion of the GUI out of the window, in response to a first multi-step gesture comprising (i) an object touching the display inside the GUI, and then (ii) the object gliding along the display in a direction away from the touched location, the GUI panning in the direction of the gliding; and
  pans the layout within the display to bring some of the gadgets into the display or to move some of the gadgets out of the display, in response to a second multi-step gesture comprising (i) the object touching the display outside the window for the GUI of the activated application, and then (ii) the object gliding along the display in a direction away from the touched location, the layout panning in the direction of the gliding,
  wherein the plurality of applications comprises a reporting application that, upon activation, displays information for a first period of time within the window for the GUI of the reporting application, and then automatically transitions to its non-activated state, and wherein in response to such transition, the user interface:
    replaces, within the layout, the window for the GUI of the reporting application with the gadget for the reporting application; and
    moves other gadgets within the layout to fill space previously occupied by the window for the GUI of the reporting application.

2. The computer readable medium of claim 1, wherein the reporting application, in its non-activated state, dynamically displays a time of day within its gadget.

3. The computer readable medium of claim 1, wherein the reporting application, in its non-activated state, dynamically displays a weather forecast within its gadget.

4. The computer readable medium of claim 1, wherein the reporting application, in its non-activated state, dynamically displays stock market information within its gadget.

5. The computer readable medium of claim 1, wherein, in response to the object touching a location in the window for the GUI of the reporting application during the first period of time, the reporting application remains in its activated state for a second period of time.

6. The computer readable medium of claim 1, wherein the user interface inserts an advertisement within the layout, and moves gadgets within the layout in order to accommodate the advertisement.

7. The computer readable medium of claim 6, wherein the user interface shifts gadgets within the layout on one side of the advertisement and does not shift gadgets within the layout on another side of the advertisement, in order to accommodate the advertisement.

8. The computer readable medium of claim 1, wherein an initial portion of the layout is shown in the display when the mobile phone is turned on, and wherein, after the user interface pans the layout to bring a different portion of the layout into the display, the user interface restores the initial portion of the layout to the display when a designated period of time of inactivity has elapsed.

9. The computer readable medium of claim 8, wherein the mobile phone comprises a home button, and wherein the user interface restores the initial portion of the layout to the display in response to actuation of the home button.

10. The computer readable medium of claim 9, wherein the user interface causes an activated application to transition to its non-activated state, in response to actuation of the home button.

11. The computer readable medium of claim 9, wherein the user interface powers off the mobile phone in response to prolonged actuation of the home button.

12. The computer readable medium of claim 1, wherein the user interface pans the layout within the display in a specific direction when the glide of the object in the second multi-step gesture is not parallel to that direction.

13. The computer readable medium of claim 1, wherein the plurality of applications comprises a music player application that, in its non-activated state, dynamically displays within its gadget information about a current song.

14. The computer readable medium of claim 1, wherein the plurality of applications comprises a video player application.

15. The computer readable medium of claim 1, wherein the plurality of applications comprises a telephone application, comprising a keypad and an address book, that, in its non-activated state, displays within its gadget information about previous calls.

16. The computer readable medium of claim 1, wherein the window for the GUI of the activated application covers most of the display.

17. The computer readable medium of claim 1, wherein the user interface displaces gadgets in only one direction within the layout in order to accommodate the window for the GUI of the activated application.

18. The computer readable medium of claim 1, wherein the user interface displaces gadgets within the layout on one side of the window for the GUI of the activated application, and does not displace gadgets within the layout on another side of that window, in order to accommodate that window.

19. The computer readable medium of claim 1, wherein the user interface prevents two different applications from running in their activated states simultaneously.

20. A non-transitory computer readable medium storing program code which, when executed by a processor of a mobile phone comprising a touch sensitive display, causes the mobile phone to present a user interface for accessing a plurality of applications, wherein the user interface:
  provides a plurality of applications and gadgets associated therewith, each such application running on the mobile phone in an activated state and in a non-activated state whereby, in its activated state, such application presents a graphical user interface (GUI) and runs interactively via the GUI, and, in its non-activated state, such application presents its associated gadget and runs non-interactively to present, within its associated gadget, dynamically generated information related to such application, and whereby tapping anywhere in its associated gadget causes such application to transition to its activated state;
  initializes the plurality of applications in their non-activated states when the phone is turned on;
  arranges the gadgets in a layout that is larger than the display, whereby some of the gadgets are in the display and others of the gadgets are out of the display; and when an application transitions to its activated state:
  alters the layout, comprising:
    displacing some of the gadgets from in the display to out of the display; and
    replacing the displaced gadgets with a window for the GUI of the activated application, the GUI being larger than the window;
  pans the GUI of the activated application within the window to bring a portion of the GUI into the window and to move another portion of the GUI out of the window, in response to a first multi-step gesture comprising (i) an object touching the display inside the GUI, and then (ii) the object gliding along the display away from the touched location; and
  pans the layout within the display to bring some of the gadgets into the display or to move some of the gadgets out of the display, in response to a second multi-step gesture comprising (i) the object touching the display outside the window for the GUI of the activated application, and then (ii) the object gliding along the display away from the touched location,
  wherein the plurality of applications comprises a reporting application that, upon activation, displays information for a first period of time within the window for the GUI of the reporting application, and then automatically transitions to its non-activated state, wherein in response to such transition, the user interface:
    replaces, within the layout, the window for the GUI of the reporting application with the gadget for the reporting application; and
    moves other gadgets within the layout to fill space previously occupied by the window for the GUI of the reporting application,
  and wherein, in response to the object touching a location in the window for the GUI of the reporting application during the first period of time, the reporting application remains in its activated state for a second period of time.

21. The computer readable medium of claim 20, wherein the reporting application, in its non-activated state, dynamically displays a time of day within its gadget.

22. The computer readable medium of claim 20, wherein the reporting application, in its non-activated state, dynamically displays a weather forecast within its gadget.

23. The computer readable medium of claim 20, wherein the reporting application, in its non-activated state, dynamically displays stock market information within its gadget.

24. The computer readable medium of claim 20, wherein the user interface inserts an advertisement within the layout, and moves gadgets within the layout in order to accommodate the advertisement.

25. The computer readable medium of claim 24, wherein the user interface shifts gadgets within the layout on one side of the advertisement and does not shift gadgets within the layout on another side of the advertisement, in order to accommodate the advertisement.

26. The computer readable medium of claim 20, wherein an initial portion of the layout is shown in the display when the mobile phone is turned on, and wherein, after the user interface pans the layout to bring a different portion of the layout into the display, the user interface restores the initial portion of the layout to the display when a designated period of time of inactivity has elapsed.

27. The computer readable medium of claim 26, wherein the mobile phone comprises a home button, and wherein the user interface restores the initial portion of the layout to the display in response to actuation of the home button.

28. The computer readable medium of claim 27, wherein the user interface causes an activated application to transition to its non-activated state, in response to actuation of the home button.

29. The computer readable medium of claim 27, wherein the user interface powers off the mobile phone in response to prolonged actuation of the home button.

30. The computer readable medium of claim 20, wherein the user interface pans the layout within the display in a specific direction when the glide of the object in the second multi-step gesture is not parallel to that direction.

31. The computer readable medium of claim 20, wherein the plurality of applications comprises a music player application that, in its non-activated state, dynamically displays within its gadget information about a current song.

32. The computer readable medium of claim 20, wherein the plurality of applications comprises a video player application.

33. The computer readable medium of claim 20, wherein the plurality of applications comprises a telephone application, comprising a keypad and an address book, that, in its non-activated state, displays within its gadget information about previous calls.

34. The computer readable medium of claim 20, wherein the window for the GUI of the activated application covers most of the display.

35. The computer readable medium of claim 20, wherein the user interface displaces gadgets in only one direction within the layout in order to accommodate the window for the GUI of the activated application.

36. The computer readable medium of claim 20, wherein the user interface displaces gadgets within the layout on one side of the window for the GUI of the activated application and does not displace gadgets within the layout on another side of that window, in order to accommodate that window.

37. The computer readable medium of claim 20, wherein the user interface prevents two different applications from running in their activated states simultaneously.

* * * * *